United States Patent
Mason et al.

(10) Patent No.: US 12,337,229 B2
(45) Date of Patent: Jun. 24, 2025

(54) ELECTRONIC CONSOLES, ASSEMBLIES, AND DEVICES FOR EXTENDED REALITY APPLICATIONS

(71) Applicant: GAMEFACE LABS INC., San Francisco, CA (US)

(72) Inventors: Edward Mason, Paget (BM); William Edward Rehbock, Santa Clara, CA (US); Kasper John Hunt, London (GB)

(73) Assignee: GAMEFACE LABS INC., San Francisco, CA (US)

( * ) Notice: Subject to any disclaimer, the term of this patent is extended or adjusted under 35 U.S.C. 154(b) by 350 days.

(21) Appl. No.: 17/724,239

(22) Filed: Apr. 19, 2022

(65) Prior Publication Data
US 2022/0347562 A1    Nov. 3, 2022

Related U.S. Application Data

(60) Provisional application No. 63/182,732, filed on Apr. 30, 2021.

(51) Int. Cl.
*A63F 13/24* (2014.01)
*G02B 27/01* (2006.01)
*G06F 1/16* (2006.01)
*H02J 1/00* (2006.01)

(52) U.S. Cl.
CPC .......... *A63F 13/24* (2014.09); *G02B 27/0176* (2013.01); *G06F 1/1632* (2013.01); *G06F 1/1635* (2013.01); *H02J 1/001* (2020.01)

(58) Field of Classification Search
CPC .... A63F 13/24; H02J 1/001; G02B 27/01766; G06F 1/1632; G06F 1/1635
USPC ............................................................ 463/31
See application file for complete search history.

(56) References Cited

U.S. PATENT DOCUMENTS

| | | | | |
|---|---|---|---|---|
| 5,991,085 A | * | 11/1999 | Rallison | G02B 27/0176 |
| | | | | 359/630 |
| 9,958,934 B1 | * | 5/2018 | Mullen | G06F 1/163 |
| 2003/0169022 A1 | * | 9/2003 | Turner | G06F 1/30 |
| | | | | 320/166 |
| 2013/0222213 A1 | | 8/2013 | Abdollahi et al. | |

(Continued)

OTHER PUBLICATIONS

Esposito, Dom, Best Modular Mini PC?! (Acer Revo Build), published to YouTube at Internet URL<https://www.youtube.com/watch?v=SVN-3YLbHe4> , @0:00-2:52. (Year: 2016).*

(Continued)

*Primary Examiner* — Ryan Hsu
(74) *Attorney, Agent, or Firm* — Bryan Cave Leighton Paisner LLP

(57) ABSTRACT

The present disclosure relates to systems, methods, apparatuses, devices, and techniques for providing electronic consoles. The electronic consoles can include a modular assembly that permits components to be arranged if varying configurations. Additionally, the electronic consoles can be configured to operate in various operational modes, including an extended reality (XR) mode, a desktop mode, and a television set top box mode. The electronic consoles can execute extended reality applications, including virtual reality applications, augmented reality applications, and/or mixed reality applications.

12 Claims, 42 Drawing Sheets

(56) References Cited

U.S. PATENT DOCUMENTS

| | | | |
|---|---|---|---|
| 2016/0041582 A1* | 2/2016 | Kim | G06F 1/1632 361/679.22 |
| 2016/0357021 A1 | 12/2016 | Abdollahi et al. | |
| 2017/0153672 A1 | 6/2017 | Shin et al. | |
| 2018/0063307 A1 | 3/2018 | Hoellwarth | |
| 2020/0154862 A1* | 5/2020 | Lam | G06F 1/163 |
| 2021/0048866 A1* | 2/2021 | Exoo | G06F 1/181 |

OTHER PUBLICATIONS

Lon.TV, Acer Revo Build Review—$179 Upgradeable Windows Mini PC—Gaming/Kodi/Office and More, published to YouTube and retrieved from Internet URL<https://www.youtube.com/watch?v=rPljnAkD_Wc>, @0:00-8:01 (Year: 2016).*

Ackerman, Dan, "Stack your own modular computer with the Acere Revo Build Series", published by CNET on Sep. 2, 2015, and retrieved from Internet URL<https://www.cnet.com/reviews/acer-revo-build-m1-601-preview/>, p. 1-6. (Year: 2015).*

Moynihan, Tim "Acer's Little Modular PC Snaps Together Like Legos", published by Wired on Sep. 2, 2015, retrieved via WayBack Machine from Internet URL<https://web.archive.org/web/20160324000507/http://www.wired.com/2015/09/acers-little-modular-pc-snaps-together-like-legos/>, p. 1-8.*

Wikipedia's, "Plug and play", retrieved via Wayback Machine via Internet URL<https://web.archive.org/web/20201027030403/https://en.wikipedia.org/wiki/Plug_and_play>, published Oct. 27, 2020, p. 1-5 (Year: 2020).*

DomEsposito (Year: 2016).*

Wired Magazine (Year: 2015).*

Wikipedia (Year: 2020).*

International Search Report and Written Opinion for PCT/US2022/26019 dated Oct. 6, 2022.

* cited by examiner

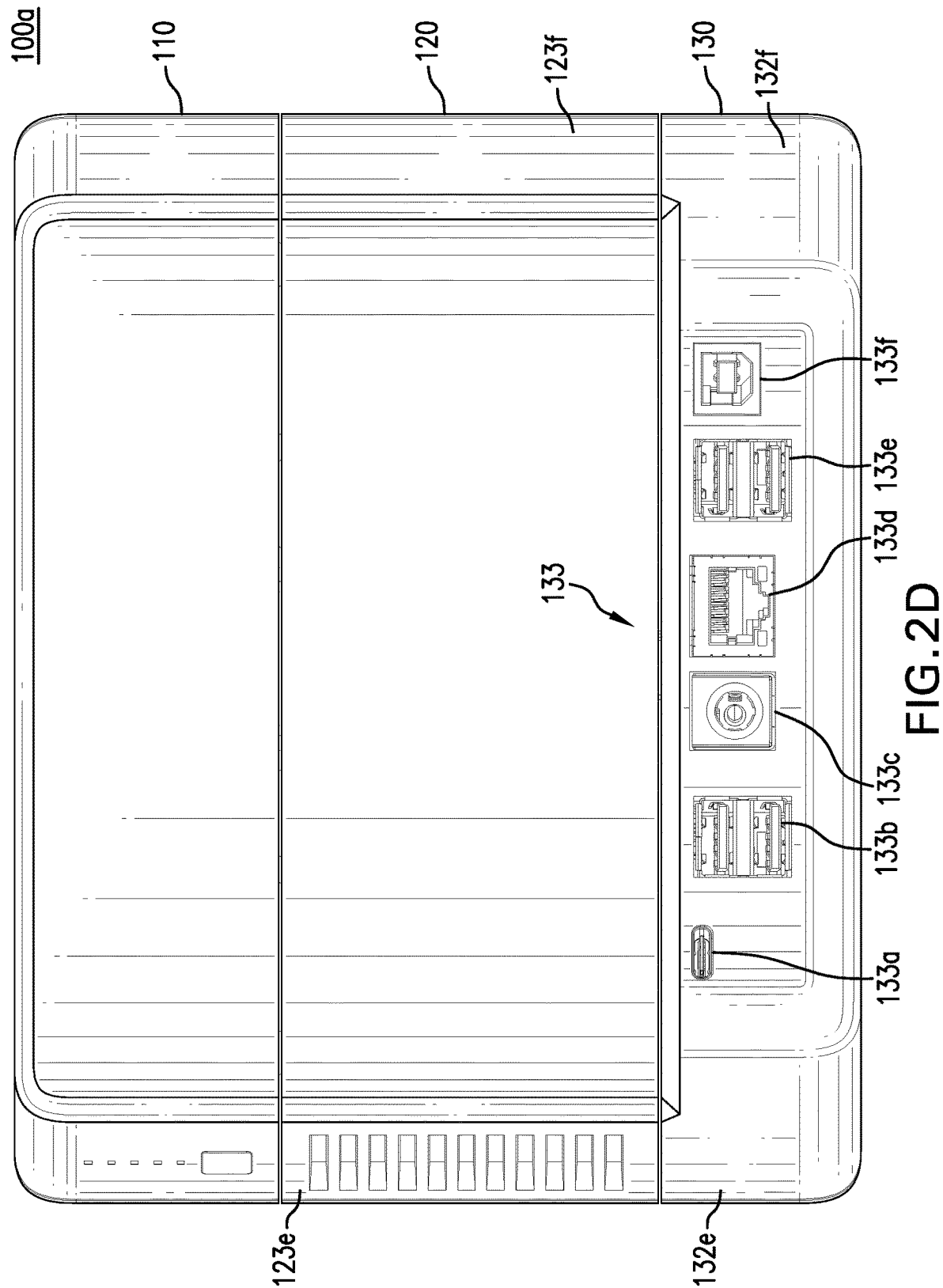

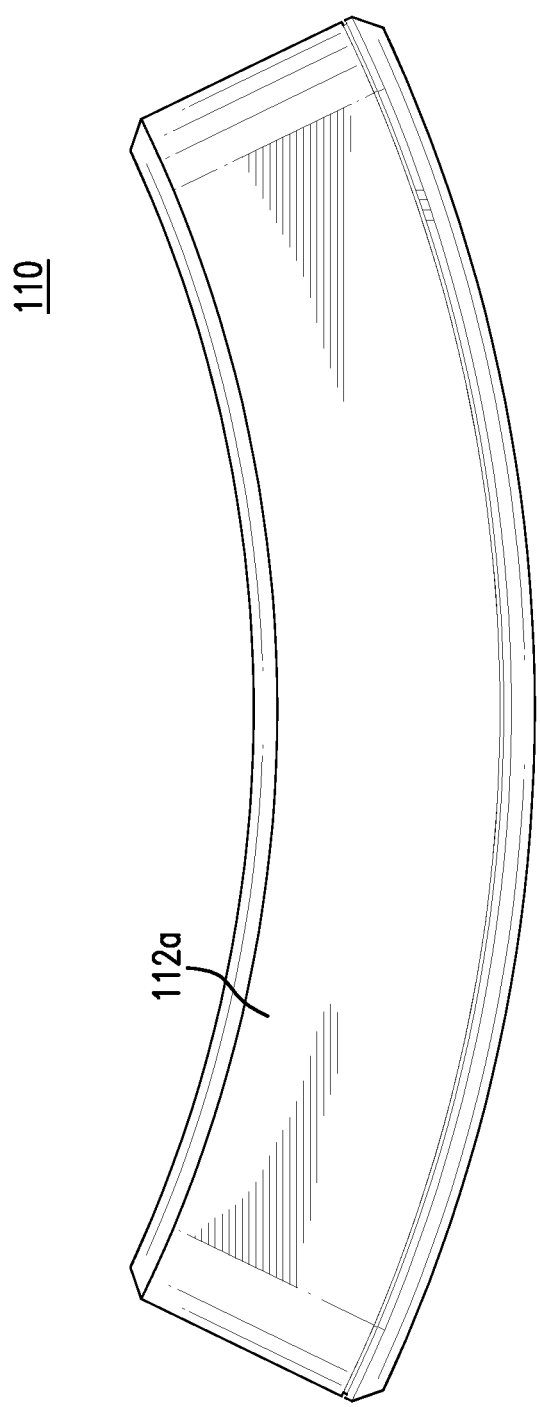

ELECTRONIC CONSOLES, ASSEMBLIES, AND DEVICES FOR EXTENDED REALITY APPLICATIONS

CROSS-REFERENCE TO RELATED APPLICATIONS

The present application claims priority to, and the benefit of, U.S. Provisional Patent Application No. 63/182,732 filed on Apr. 30, 2021. The aforementioned application is herein incorporated by reference in its entirety as if recited full herein.

TECHNICAL FIELD

This disclosure is related to improved electronic consoles that are configured to execute extended reality (XR) applications, including virtual reality applications, augmented reality applications, and/or mixed reality applications. In certain embodiments, the electronic console is configured in a modular configuration that enables the electronic console to be arranged in different configurations and to operate in different operational modes.

BACKGROUND

In general, XR systems use technologies to provide computer-generated simulations or environments to users of the systems. Examples of these technologies can include virtual reality, augmented reality, and mixed reality applications and systems. Virtual reality systems generally use technologies that generate three-dimensional images and/or environments, which can be interacted with by users in seemingly real or physical way. Augmented reality systems often use technologies to generate enhanced visualizations of the real physical world using digital visual elements, sound, and/or other sensory stimuli and, in many cases, can superimpose computer-generated images on a user's view of the real world. Mixed reality systems often use similar technologies that merge real and virtual worlds to produce composite environments and visualizations. In many scenarios, these and other extended reality systems utilize specialized electronic equipment, such as head-mounted displays or devices (HMDs), to generate and visualize these enhanced environments and visualizations.

BRIEF DESCRIPTION OF DRAWINGS

To facilitate further description of the embodiments, the following drawings are provided, in which like references are intended to refer to like or corresponding parts, and in which:

FIG. 2D is a rear view of the electronic desktop console shown in FIG. 2A;

FIG. 6G is a top view of the battery portion shown in FIG. 6A;

DETAILED DESCRIPTION OF EXEMPLARY EMBODIMENTS

Figure 1A:
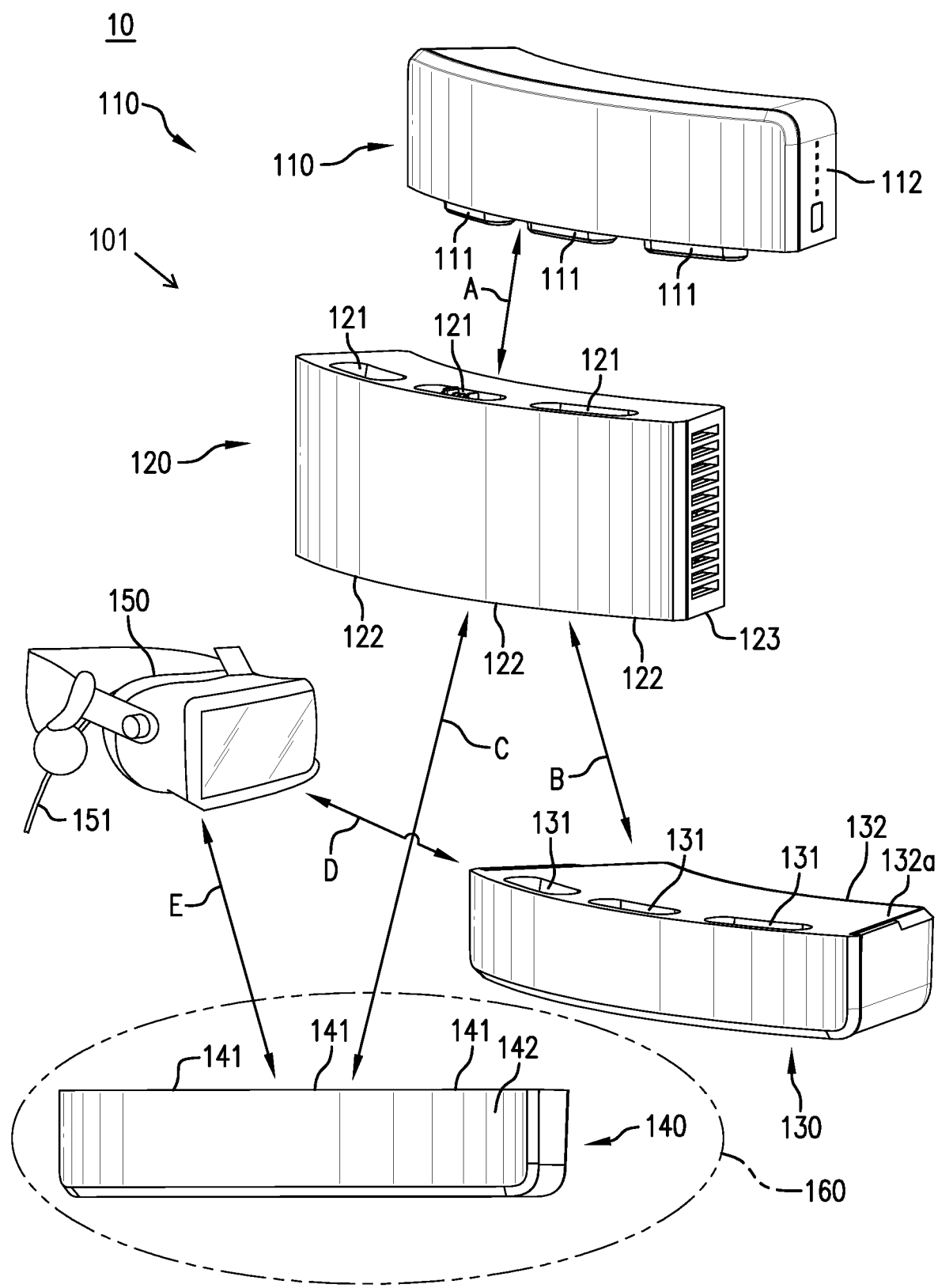
FIG. 1A is system of components that can be arranged in various electronic console configurations in accordance with certain embodiments.

The present disclosure relates to systems, methods, apparatuses, devices, and techniques for providing electronic consoles. In certain embodiments, the electronic consoles can be configured to operate in various operational modes, including an extended reality (XR) mode, a desktop mode, and a television set top box mode. The electronic consoles can execute extended reality applications (e.g., including virtual reality applications, augmented reality applications, and/or mixed reality applications) and/or other types of applications in various operational modes.

In certain embodiments, the electronic consoles can be configured in a modular configuration that includes a separate battery portion, processing portion, and at least one dock portion (e.g., a mobile dock portion and/or a desktop dock portion). For example, an electronic console can include a battery portion that is detachably connected to a first surface of a processing portion, and at least one docking portion that is detachably connected to a second surface of the processing portion. The battery portion can be configured with one or more battery cells that power the electronics included in the processing portion and dock portions. The processing portion can include one or more processors (e.g., GPUs and/or CPUs) for executing the extending reality applications and/or other applications. The dock portions can include various connection interfaces, such input/output (I/O) connectors, power input connectors, and/or data interfaces, for connecting devices (e.g., head-mounted devices/displays (HMD), peripherals, etc.) to the electronic console. Each of the battery, processing, and dock portions can include connectors that enable detachment and reattachment of these components to each other.

The modular configuration of the electronic consoles provides a number of advantages. One advantage of the modular configuration is that the electronic consoles can be configured with hot swappable battery portions. For example, when a user is engaging in an extended reality application (or other applications or functions) and the battery life of a connected battery portion is low (or has been completely drained), the modular configuration of the electronic console permits the user to remove the connected battery portion and replace it with a second battery portion. Moreover, while swapping battery portions, the processing portion of the electronic console is able to function in a standby mode that saves the status of the extended reality application (or other application) so the user can resume the application from the point where they left off after the second battery portion is connected to the electronic console.

Another advantage of the modular configuration is that it permits the electronic console to be arranged and connected in multiple configurations, including a mobile gaming configuration and a desktop console configuration. As explained below, a surface of the processing portion includes connectors that are able to mate with both a mobile dock portion and a desktop dock portion. The mobile dock portion and desktop dock portion can include various connection interfaces. In some embodiments, the mobile dock portion can include connection interfaces for connecting one or more head-mounted devices/displays (HMD). The desktop dock portion can include one or more HMD connection interfaces, as well as network interfaces (e.g., for connecting to the Internet and/or other networks) and peripheral interfaces (e.g., for connecting computer peripheral devices). In some embodiments, the mobile dock portion can include a connection for coupling to external power (e.g., an external AC or DC power source). In this regard, an external power source may be used to power one or components of the processing portion and or charge a battery portion coupled to the processing portion. The housing structure of the desktop dock portion can include a lower surface that enables the electronic console to rest on a flat surface (e.g., a floor surface or table). The housing structure of the mobile dock portions can include a more compact structure that enables it to be transported more easily and/or to be included in a wearable carrier.

Another advantage of the modular configuration is that it permits the battery portion of the electronic console to be connected directly to the dock portions for charging one or more battery cells included in the battery portion. For example, the same connectors that are utilized to couple the battery portion to the processing portion also can be used to couple the battery portion to the dock portions. The dock portions can include at least one connection interface that receives a wire or cord that can be connected to an outlet (e.g., an AC outlet), and the battery portion can be charged by connecting the battery portion directly to the dock portion or indirectly to the dock portion via an intermediate processing portion.

As mentioned above, the processing portion can be connected to a mobile dock portion. In certain cases, the mobile dock portion can be integrated into, or attached to, a wearable carrier apparatus. In some cases, the wearable carrier apparatus can be arranged as a sling. Additionally, or alternatively, the wearable carrier apparatus can be arranged in other wearable configurations (e.g., a backpack, waistband, sleeve, belt, helmet, etc.). Regardless of the configuration, the wearable carrier apparatus can be configured to hold and transport the electronic console, and to execute extended reality applications while the electronic console is included in the wearable carrier apparatus (and without requiring the electronic console to be connected to an outlet). The wearable carrier apparatus thus permits users to be mobile while engaging in extended reality applications and does not limit their movement to a range that is dependent on the length of a wired connection.

In certain embodiments, another advantage of the electronic console is that it can include a dynamic device manager that permits a wide variety of head-mounted displays (HMDs), peripherals, and other devices to be easily and seamlessly connected to, and utilized in connection with the electronic console. For example, the power requirements, video settings, and sensor configurations of HMDs can vary significantly across different models and brands. To address these varying configurations and settings, the dynamic device manager can detect the type or model of a HMD connected to the electronic console, and automatically configure and adjust power the power settings, video settings, and/or sensor settings to facilitate usage of the connected HMD. Thus, the dynamic device manager permits users to easily connect and use different HMDs without manually configuring the electronic console.

In certain embodiments, another advantage of the electronic console is that it can be configured to operate in an XR mode (e.g., an extended reality gaming mode) a desktop mode, and television set top box mode. In the XR mode, the electronic console can be configured to execute one or more gaming applications (e.g., extended reality applications) and, in many cases, can power and utilize a connected HMD in connection with executing the XR applications. In the desktop mode, the electronic console can be utilized as a traditional computer. For example, when operating in desktop mode, the electronic console may execute one or more operating systems (e.g., such as Linux®, Android®, MacOS®, iOS®, etc.). Additionally, various peripheral devices (e.g., computer monitors, mouse devices, keyboards, speakers, input/output devices, etc.) can be connected to the dock portion of the electronic console to permit the electronic console to be used as a traditional computing device. In the television set top box mode, the electronic console can be connected to one more television devices (or other displays) and one or more television networks. The electronic console can enable content to be received from the television networks and displayed on the television devices or displays.

While certain portions of this disclosure may describe the electronic console as executing extended reality applications in some instances, it should be recognized that the electronic console can execute any type of application. Any reference to the electronic console executing an extended reality application also can be understood to apply to executing other types of applications (e.g., traditional non-extended reality gaming applications, video games, desktop applications, etc.).

As evidenced by the disclosure herein, the inventive techniques set forth in this disclosure are rooted in extended reality technologies that overcome existing problems in known electronic consoles, including problems associated with powering the consoles, accommodating various hardware configurations (e.g., HMD configurations), and restricting users' movements when engaging in XR applications. The technologies described in this disclosure provide a technical solution for overcoming the aforementioned limitations (as well as other limitations) associated with known electronic consoles. For example, as explained in further detail below, the electronic consoles can permit hot swappable battery portions to be replaced without interrupting the execution of XR applications and/or other applications. Additionally, the electronic consoles can automatically be configured to use various HMDs and peripheral devices that are connected to dock portions of the electronic consoles. Moreover, the electronic consoles can be configured in mobile arrangements that permit users to freely move about while engaging in XR applications and/or other applications. Furthermore, the electronic consoles can be configured in multiple operational modes (e.g., XR mode, desktop mode, and TV mode), and the electronic consoles can automatically configure itself to operate in a desired operational mode based on connected hardware. This technology-based solution marks an improvement over existing capabilities and functionalities related to electronic consoles, including gaming consoles configured for virtual reality, augmented reality, and/or mixed reality applications.

Figure 1B:
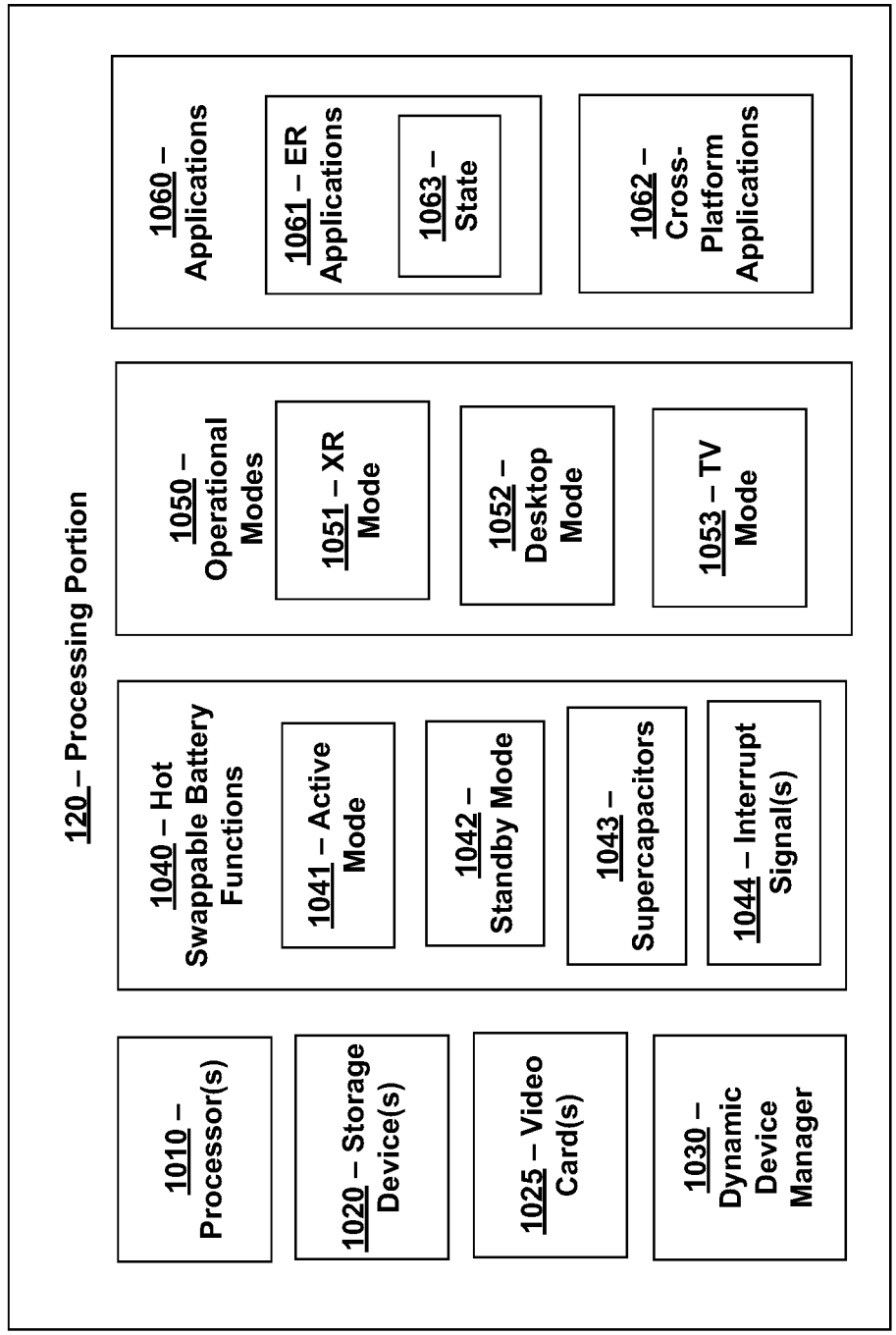
FIG. 1B is block diagram illustrating an exemplary configuration of a processing portion in accordance with certain embodiments.
Figure 1C:
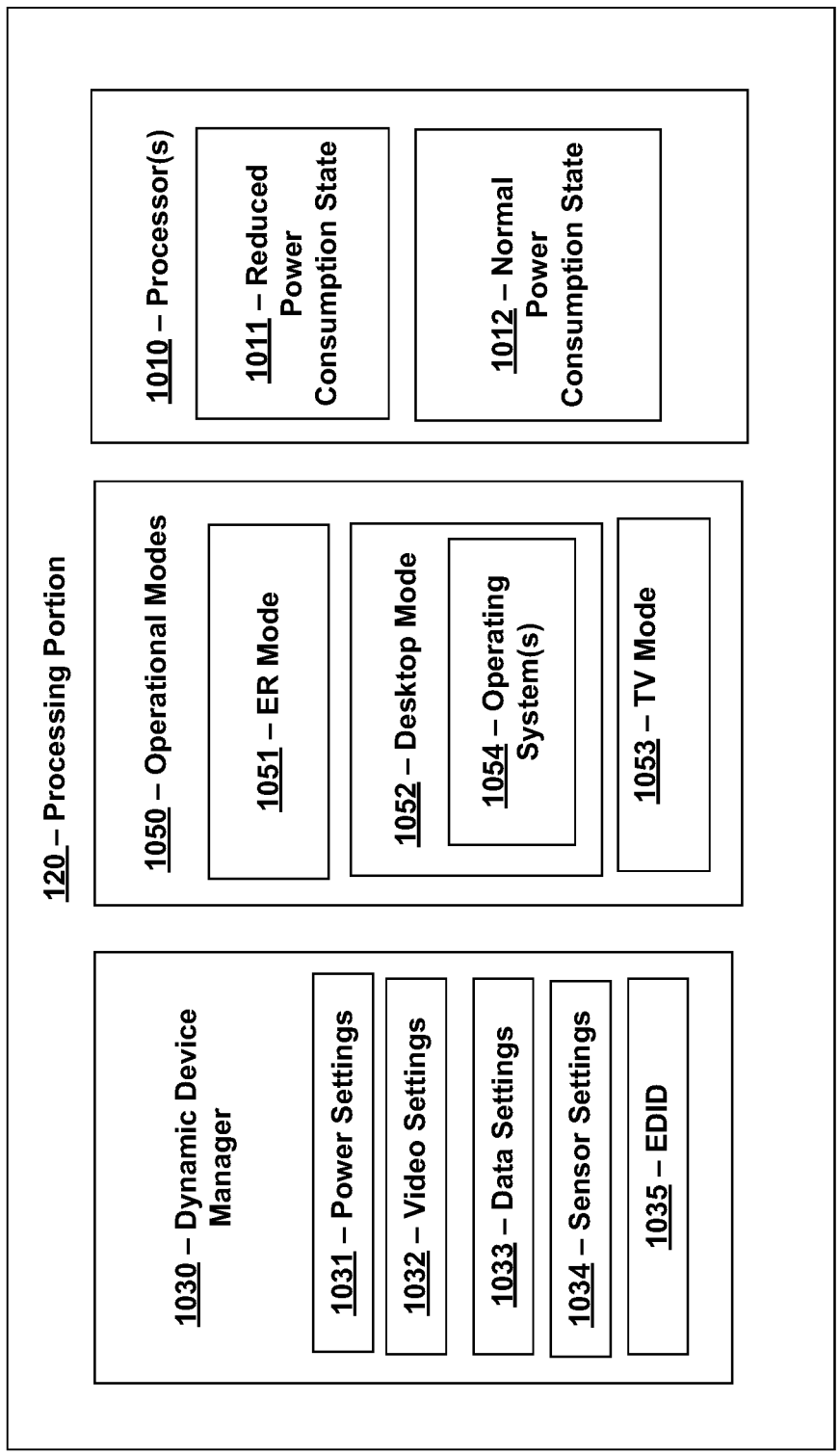
FIG. 1C is a block diagram illustrating additional details of the exemplary configuration shown in FIG. 1B.

FIG. 1A illustrates a system 10 according to certain embodiments. FIG. 1B-1C are block diagrams illustrating exemplary components and functions performed by the processing portion. FIGS. 1A-C are discussed jointly below.

Figure 2A:
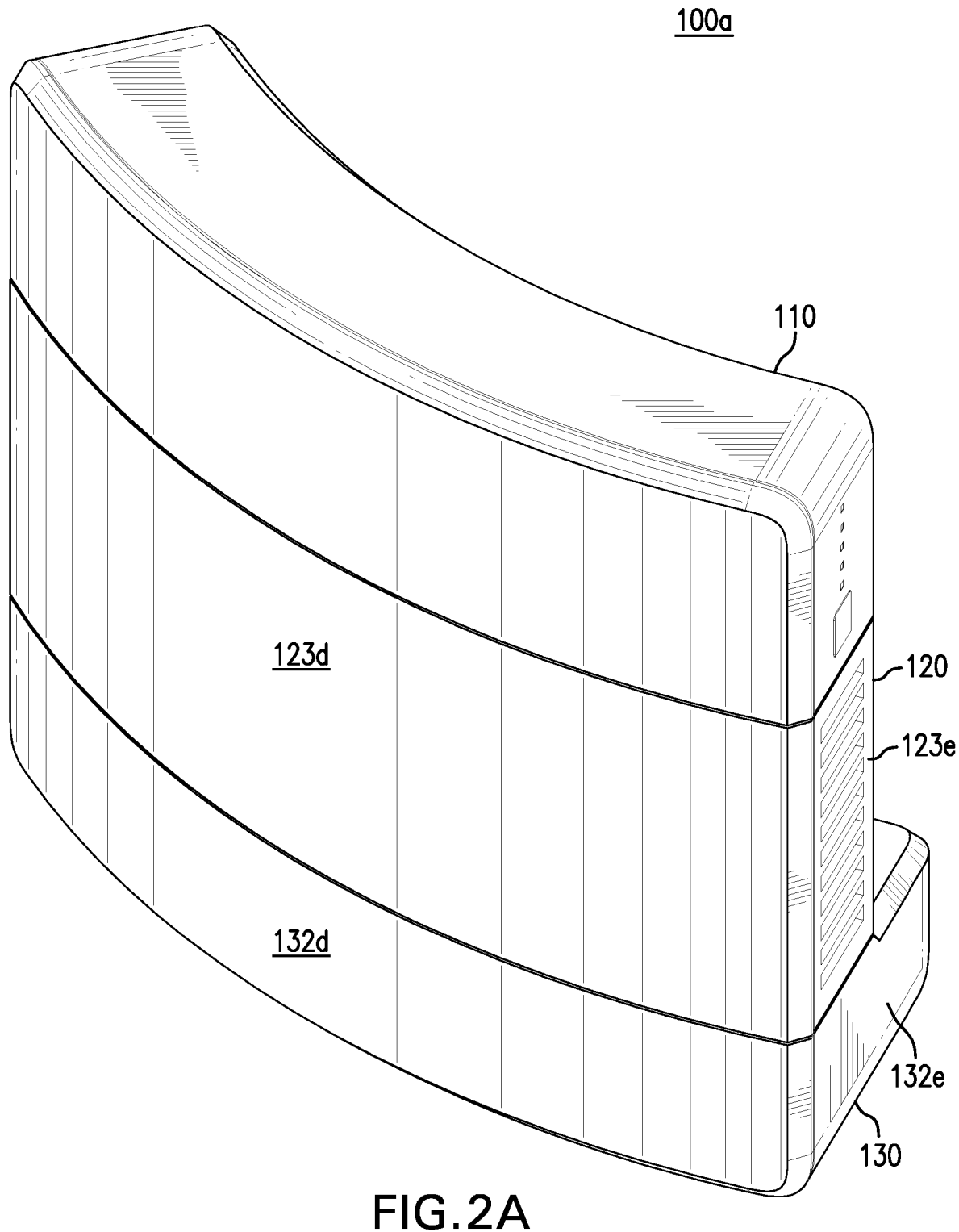
FIG. 2A is a front perspective view of an electronic desktop console in accordance with certain embodiments.
Figure 2B:
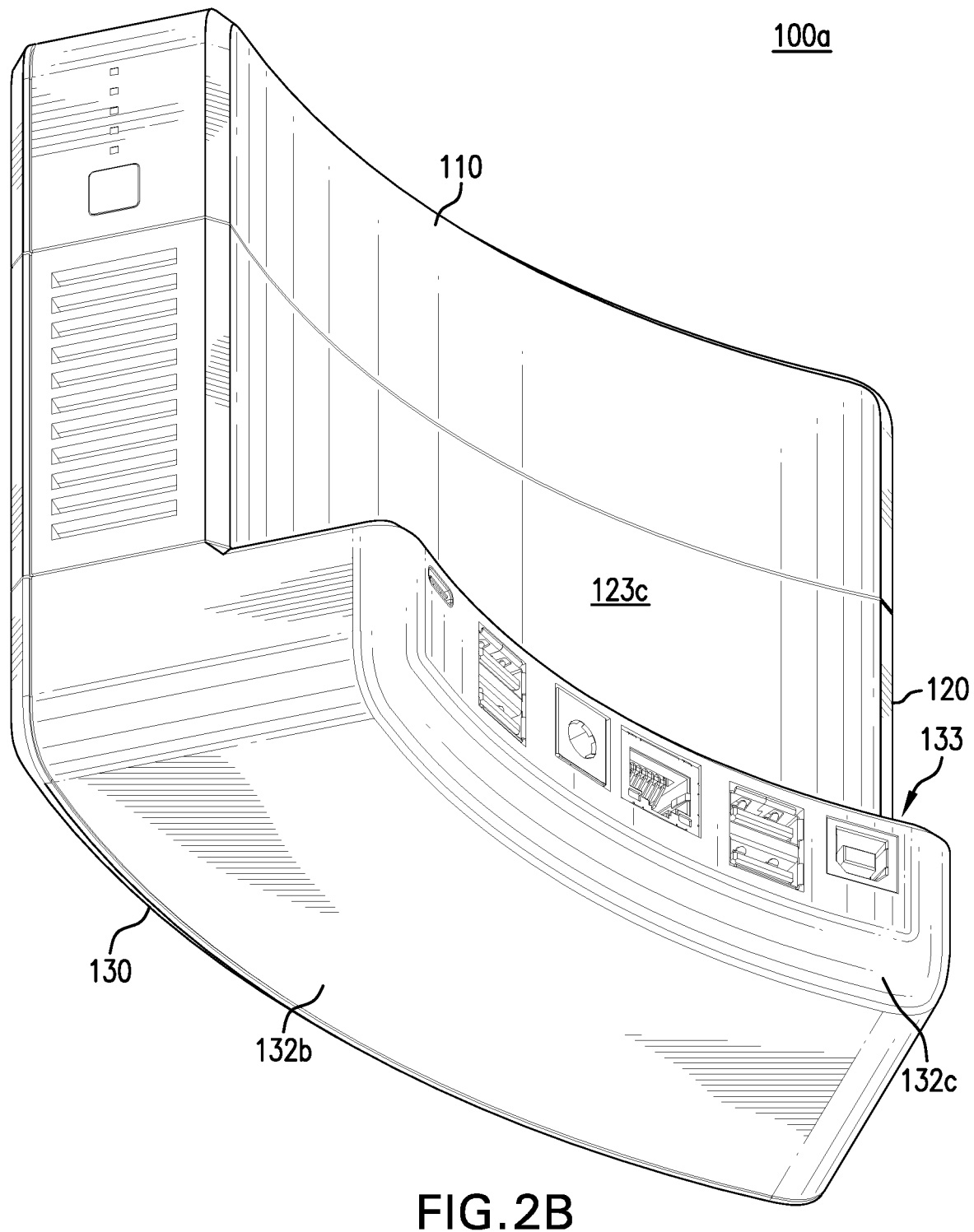
FIG. 2B is a rear perspective of the electronic desktop console shown in FIG. 2A.
Figure 2C:
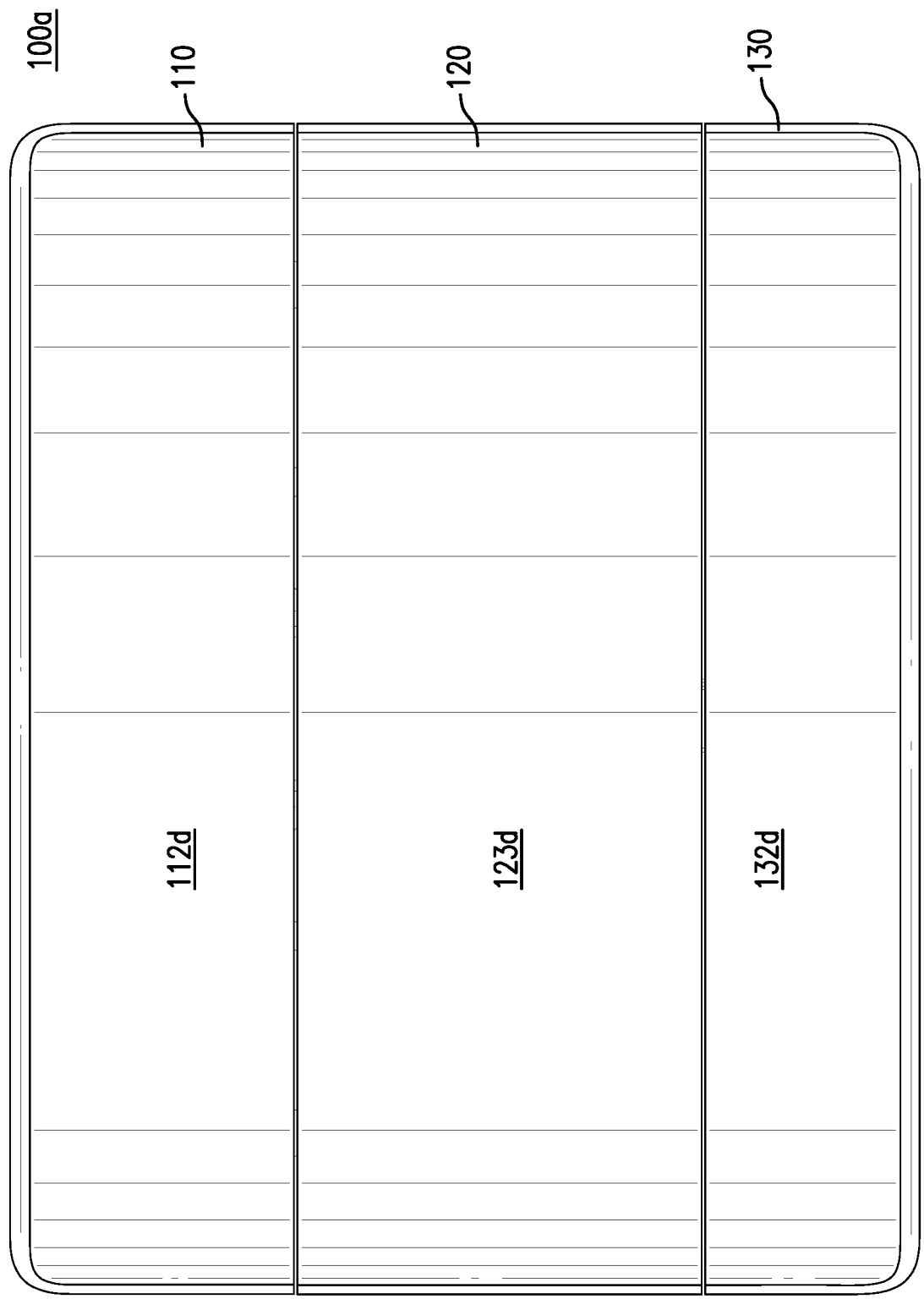
FIG. 2C is a front view of the electronic desktop console shown in FIG. 2A.
Figure 2E:
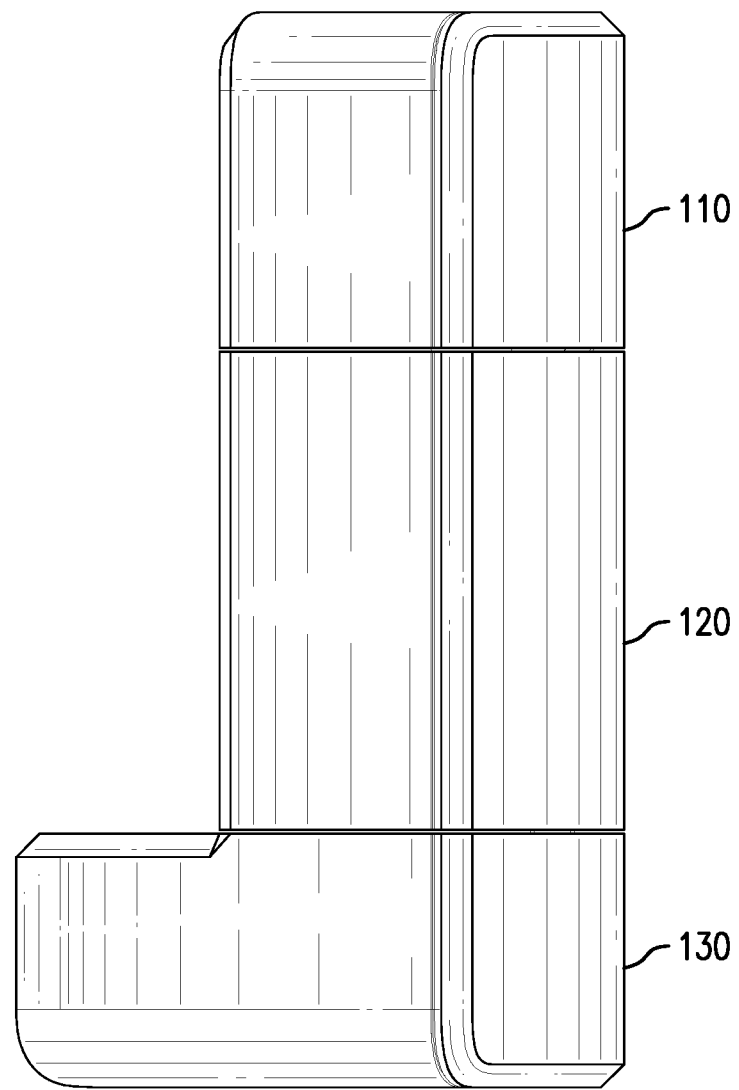
FIG. 2E is a side view of the electronic desktop console shown in FIG. 2A.
Figure 2F:
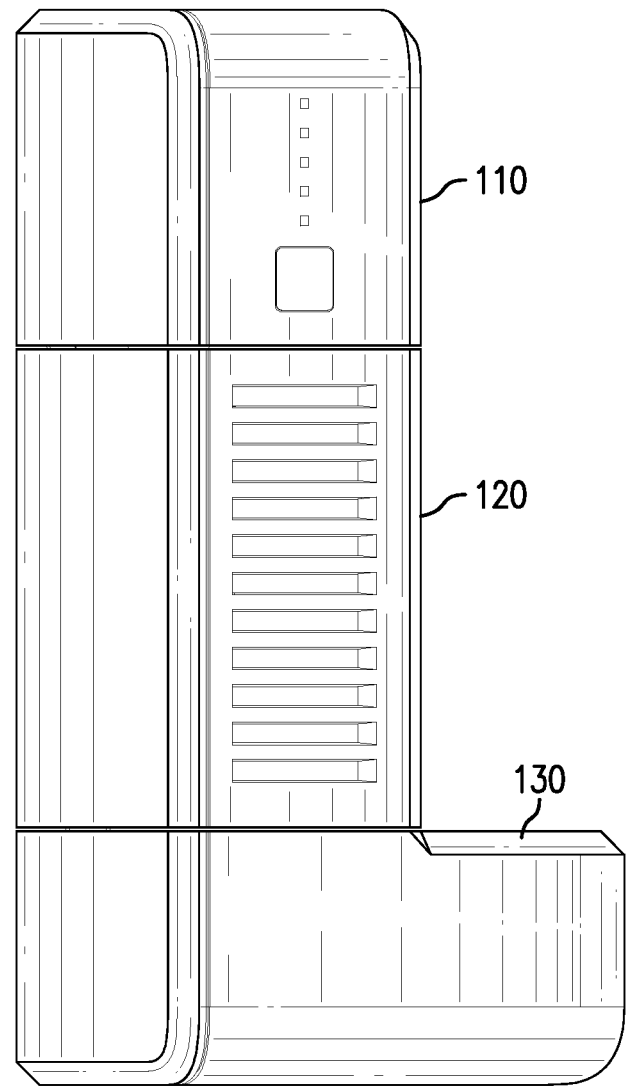
FIG. 2F is an opposite view of the electronic desktop console shown in FIG. 2A.
Figure 2G:
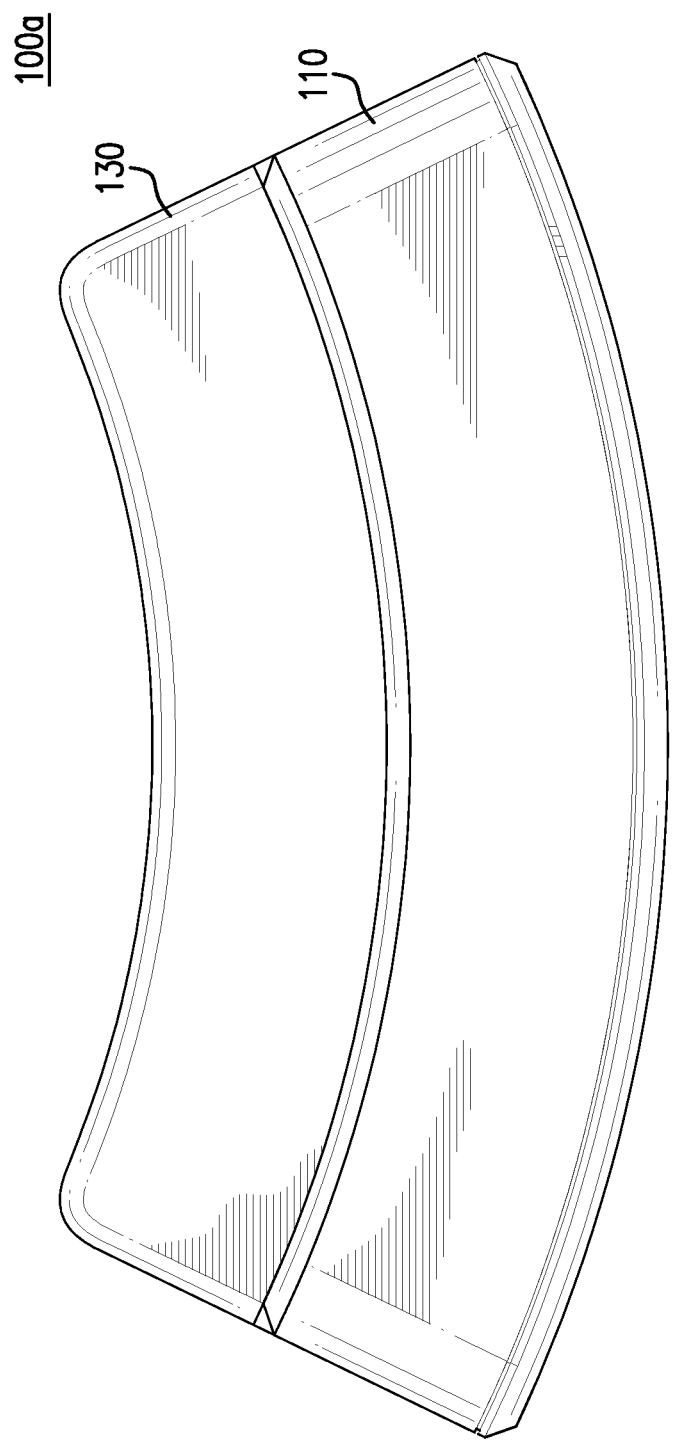
FIG. 2G is a top view of the electronic desktop console shown in FIG. 2A.
Figure 2H:
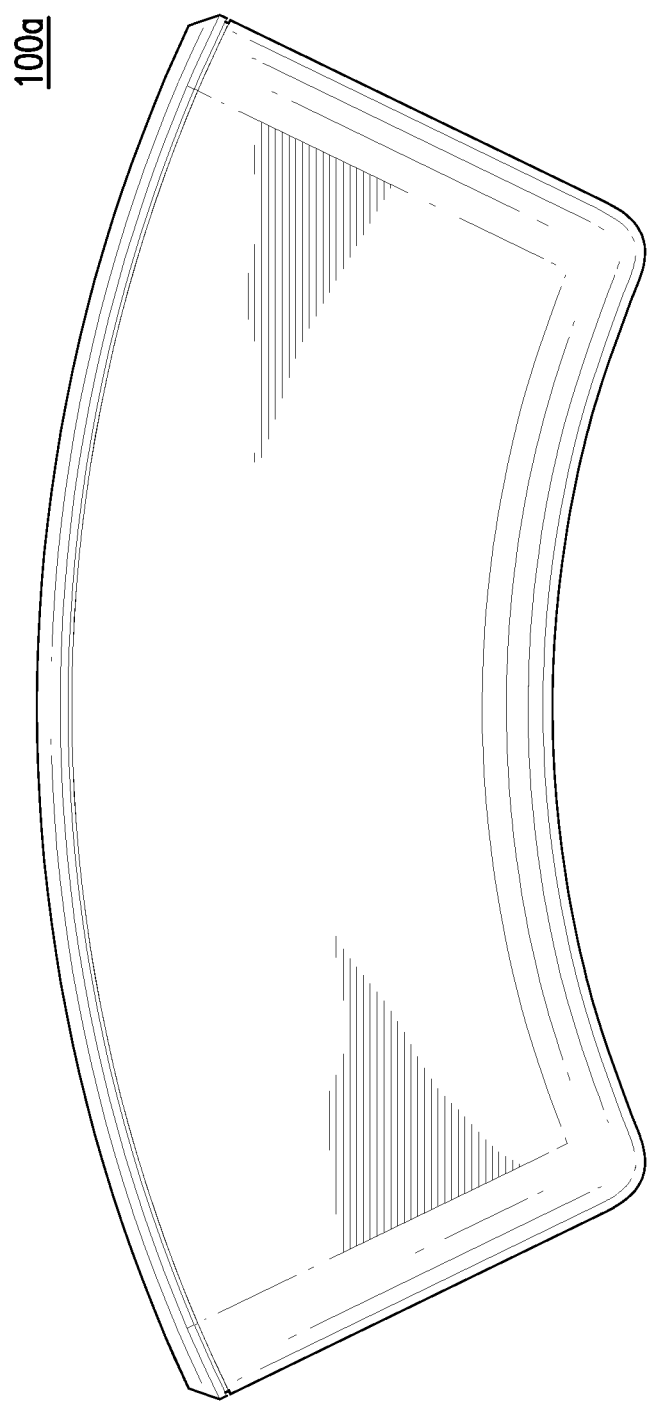
FIG. 2H is a bottom view of the electronic desktop console shown in FIG. 2A.

The system 10 includes a battery portion 110, a processing portion 120, a desktop dock portion 130, a mobile dock portion 140, a head-mounted device/display (HMD) 150, and a wearable carrier 160. The components of the system 10 are configured to be modular and can be arranged, and connected to each other, in various ways to form an electronic console 100. For example, as described in further detail below, the battery portion 110, processing portion 120, desktop dock portion 130, and mobile dock portion 140 may represent detachable console portions 101 that permit an electronic console 100 to be vertically arranged in a plurality of console configurations including a desktop console configuration (e.g., configuration 100A in FIG. 2A), a mobile console configuration (e.g., configuration 100B in FIG. 3A), and a charging configuration (e.g., configuration 100C in FIG. 5).

Connection A is a connection between the battery portion 110 and the processing portion 120. Connection A can enable power or charge to be supplied from the battery portion 110 to the processing portion 120 (and any components directly or indirectly connected to the processing portion). Connection B is a connection between the processing portion 120 and the desktop dock portion 130. Connection B can enable power or charge to be supplied to the desktop dock portion 130, and can enable data to be exchanged between the processing portion 120 and desktop dock portion 130. Connection C is a connection between the processing portion 120 and the mobile dock portion 140. Connection C can enable power or charge to be supplied to the mobile dock portion 140, and can enable data to be exchanged between the processing portion 120 and mobile dock portion 140. Connection D is a connection between the HMD 150 and the desktop dock portion 130. Connection D can enable power to be supplied from the desktop dock portion 130 to the HMD 150, and can enable data to be exchanged between the desktop dock portion 130 and the HMD 150. Connection E is a connection between the HMD 150 and the mobile dock portion 140. Connection E can enable power to be supplied from the mobile dock portion 140 to the HMD 150, and can enable data to be exchanged between the mobile dock portion 140 and the HMD 150. Connections A, B, C, and/or D may be implemented using a proprietary interface or a standard interface, such as: USB (e.g., USB-C), Thunderbolt, etc. Connections A, B, C, and/or D may also be implemented using a wireless interface (e.g., WiFi, Bluetooth) in order to supply data in combination with a more limited physical connection for supping power between the portions.

FIGS. 2A-2H illustrate one exemplary configuration in which the battery portion 110, processing portion 120, and desktop dock portion 130 can be connected to form an electronic desktop console 100A. In this configuration, the electronic desktop console 100A can operate in multiple operational modes 1050, including an XR mode 1051 (e.g., an XR gaming mode), desktop mode 1052, and television (TV) mode 1053.

For example, the electronic desktop console 100A can operate in an XR mode 1051 in which it functions as a gaming console (e.g., which executes XR applications 1061, cross-platform applications 1062, video games, and/or other applications 1060). Any applications 1060 executed in the XR mode 1051 can be stored one or more storage devices 1020.

When operated in the XR mode 1051, one or more HMDs 150 can be connected (e.g., using connector 151) to the connection interfaces 133 included on the desktop dock portion 130 to be used in connection with the XR applications 1061, cross-platform applications 162, video games, and/or other applications 1060. The processing portion 120 can exchange data (e.g., position sensor data from one or more inertial measurement units (IMUs) and/or light sensor data) with the HMDs 150 and generate video and audio for output on the HMDs 150. The battery portion 110 or AC power can power the HMDs 150, processing portion 120, desktop dock portion 130, HMDs 150, and/or other connected devices during operation.

The electronic desktop console 100A also can operate in a desktop mode 1052 in which it operates as a traditional desktop computer. For example, when operating in a desktop mode 1052, the electronic desktop console 100A can execute one or more operating systems 1054. Exemplary operating systems 1054 may include Linux®, Android®, MacOS®, iOS®, etc. Additionally, multiple computer peripherals (e.g., such as monitors, mouse devices, keyboards, etc.) can be connected to the connection interfaces 133 included on the desktop dock portion 130, and utilized by users to interact with the electronic desktop console 100A. For example, a monitor connected to the electronic desktop console 100A can display graphical user interfaces (GUIs), and users can execute local applications 1600 stored on the electronic desktop console 100A (e.g., stored on one or more storage devices 1020). The connection interfaces 133 also can include network interfaces (e.g., wired interfaces, such as Ethernet and/or wireless interfaces, such as WiFi, Bluetooth, or cellular 4G/5G) that enable users to access one or more networks (e.g., the Internet) via the electronic desktop console 100A.

The electronic desktop console 100A also can operate in a television (TV) mode 1053 in which it functions as a television set top box. For example, when operating in a TV mode 1053, one or more television devices (or other monitors) and/or one or more television modems can be connected to the connection interfaces 133 on the desktop dock portion 130, and the desktop electronic console 100A can transmit and receive information over a television network. Video and audio (e.g., television programs) can be output on the on the television devices (or other display monitors).

Figure 3A:
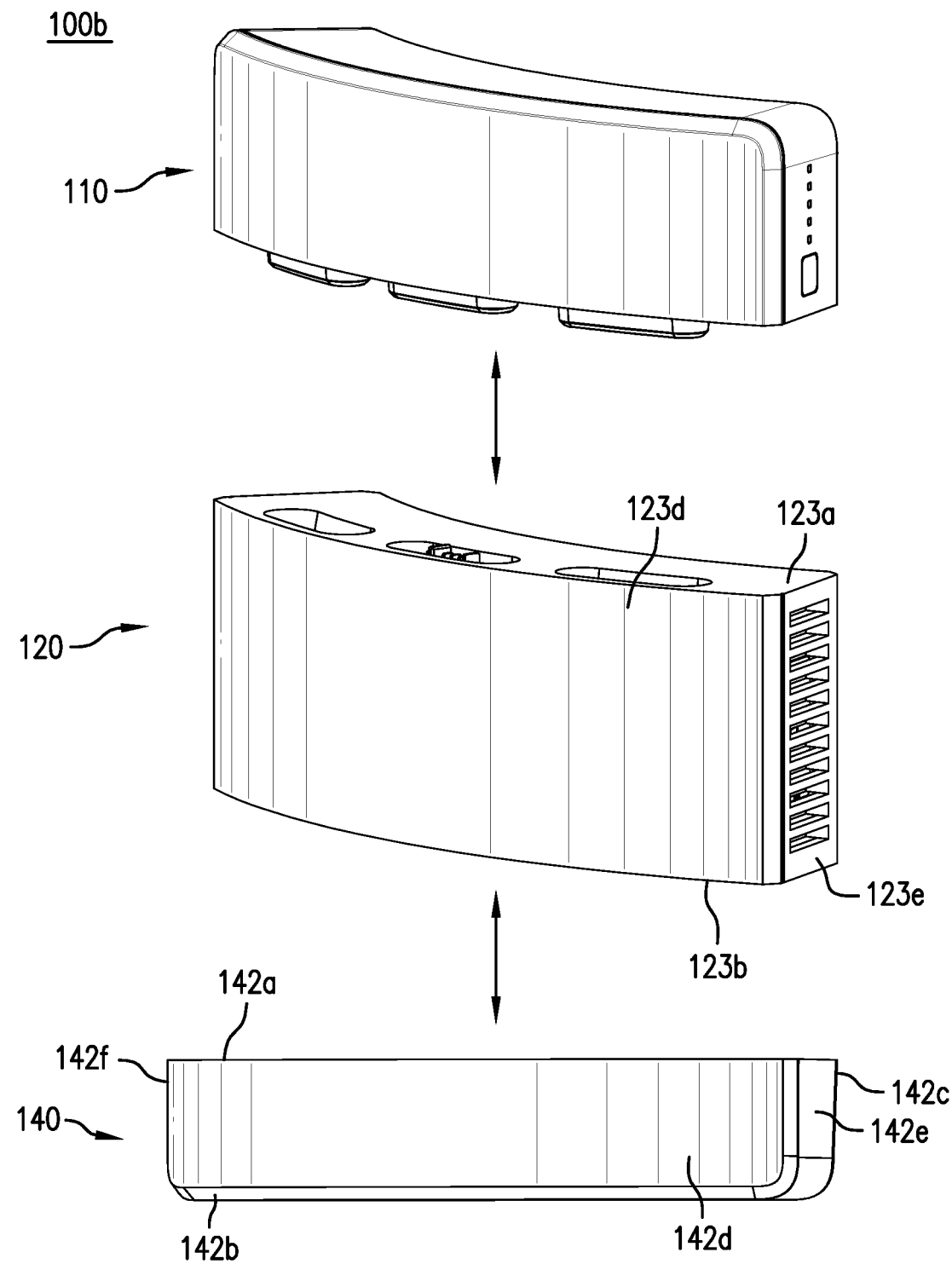
FIG. 3A illustrates a mobile electronic console configuration according to certain embodiments.
Figure 3B:
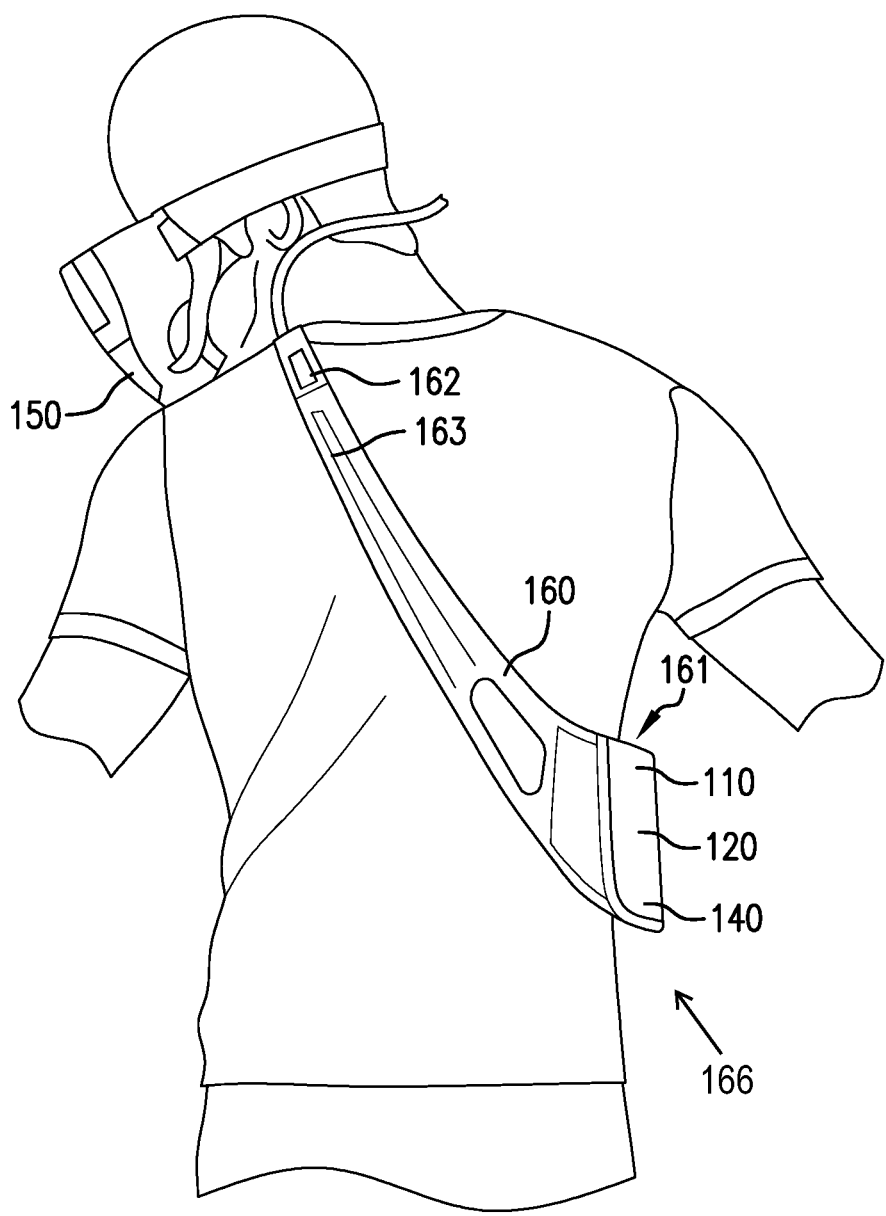
FIG. 3B is an illustration of an exemplary wearable carrier that is equipped with a mobile electronic console according to certain embodiments.
Figure 3C:
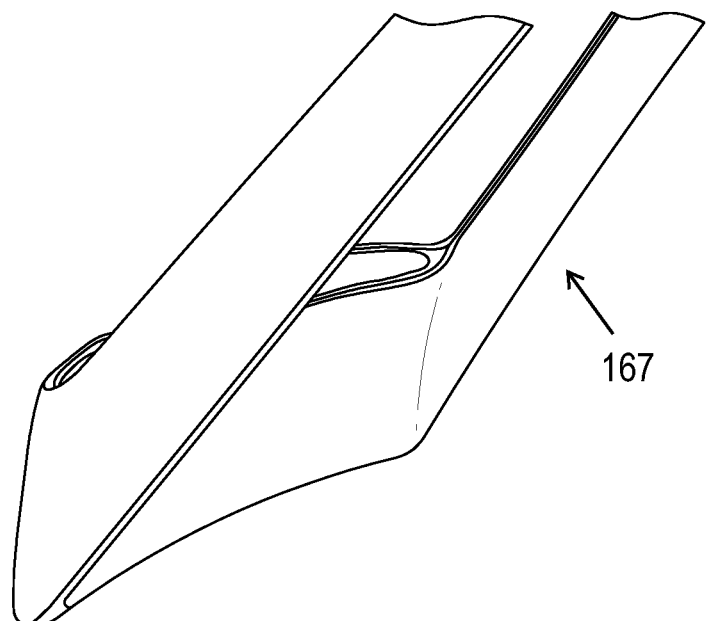
FIG. 3C is an illustration of an exemplary wearable carrier that is equipped with a mobile electronic console according to certain embodiments.
Figure 3D:
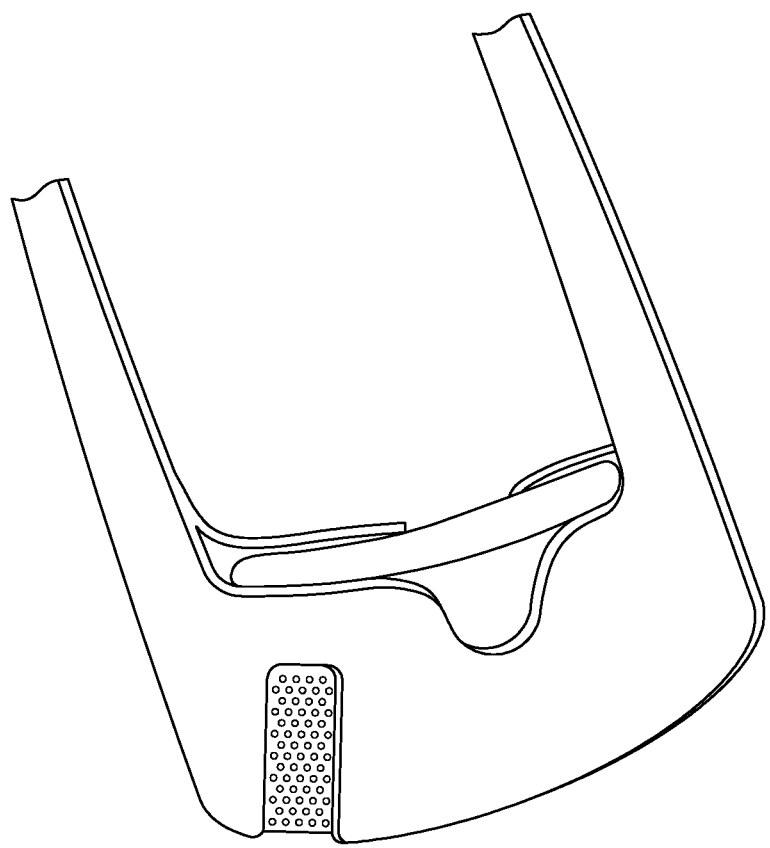
FIG. 3D is an illustration of an exemplary wearable carrier that is equipped with a mobile electronic console according to certain embodiments.
Figure 4A:
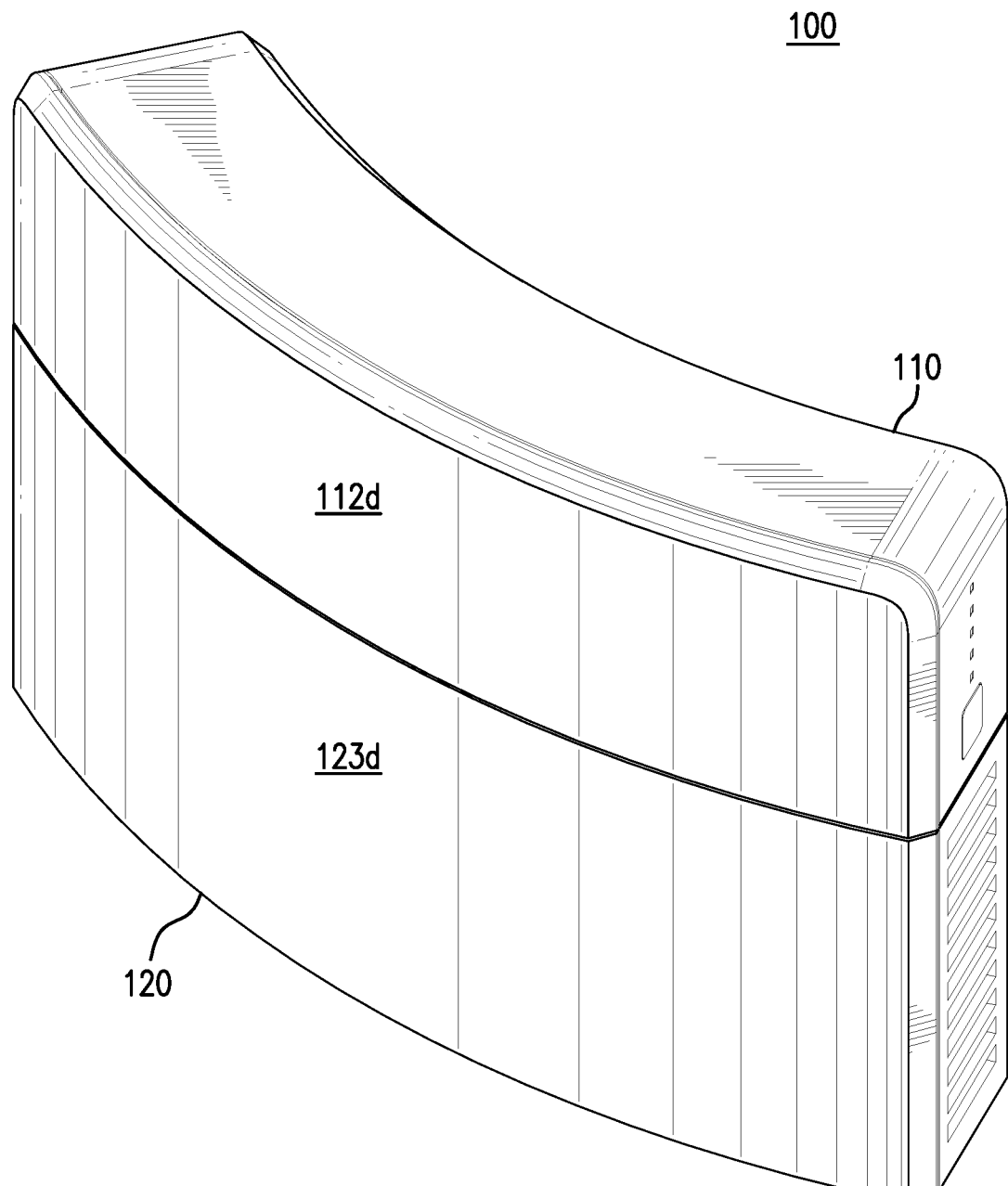
FIG. 4A is a front perspective view of a portion of an electronic console in accordance with certain embodiments.
Figure 4B:
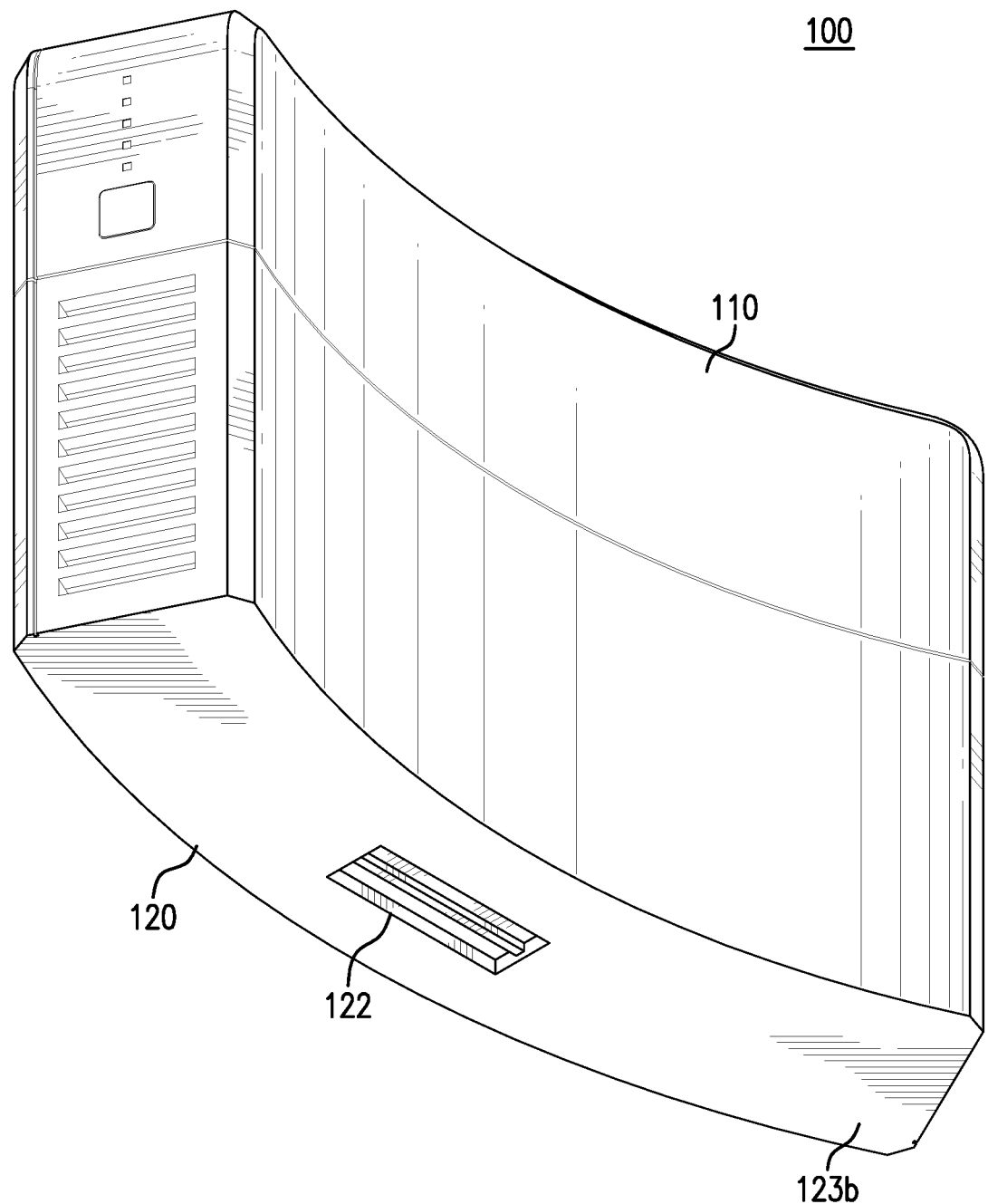
FIG. 4B is a rear perspective of the portion of the electronic console shown in FIG. 4A.
Figure 4C:
FIG. 4C is a front view of the portion of the electronic console shown in FIG. 4A.
Figure 4D:
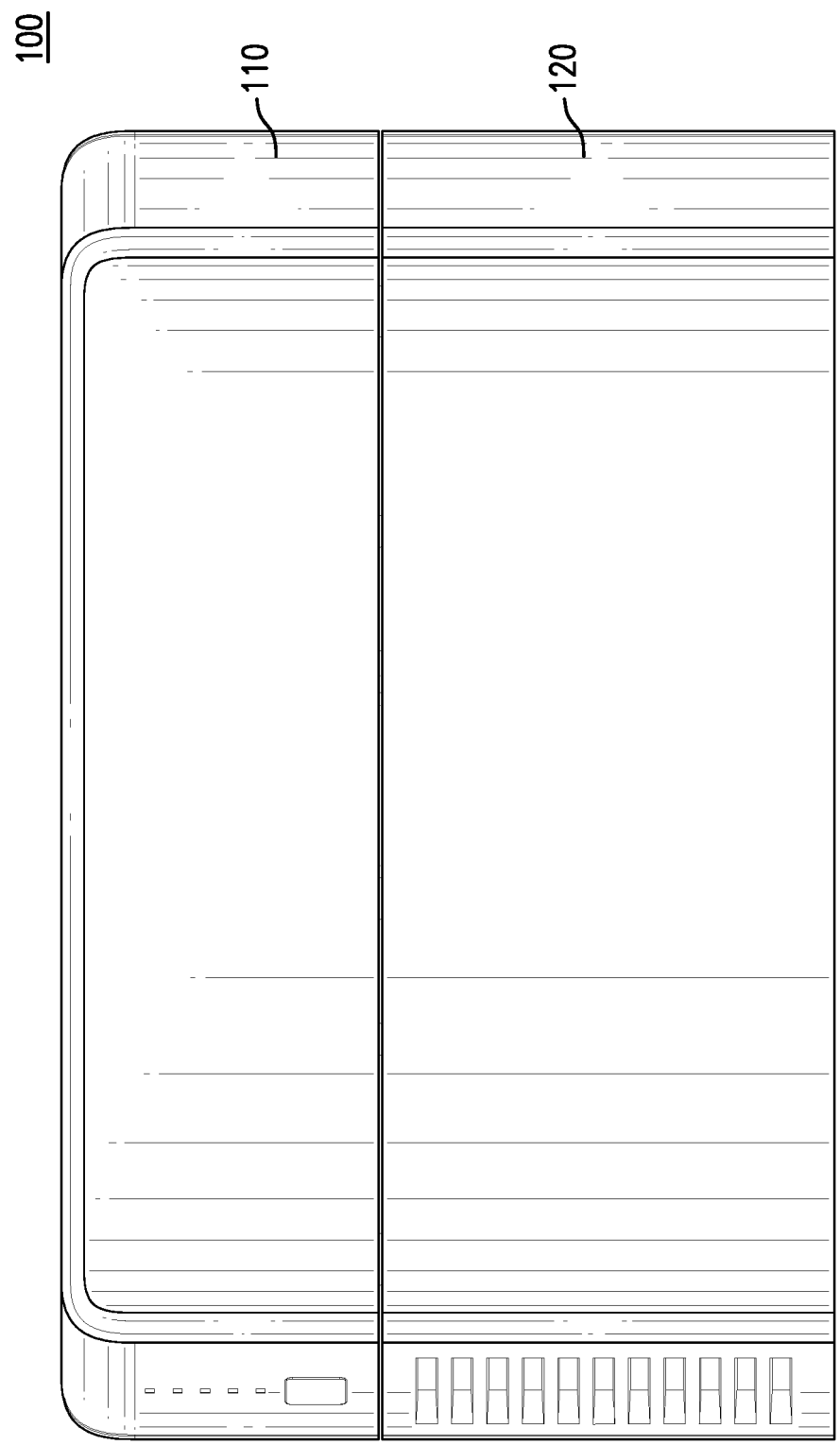
FIG. 4D is a rear view of the portion of the of the electronic console shown in FIG. 4A.
Figure 4E:
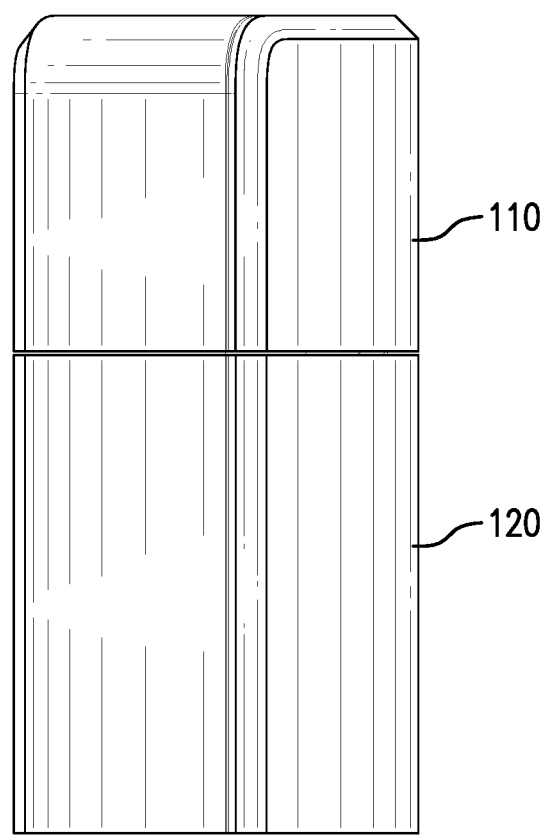
FIG. 4E is a side view of the portion of the electronic console shown in FIG. 4A.
Figure 4F:
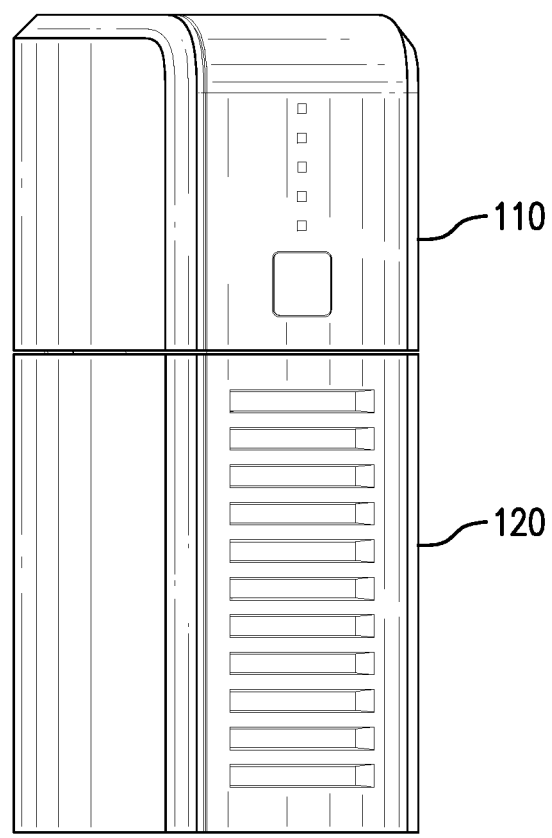
FIG. 4F is an opposite view of the portion of the electronic console shown in FIG. 4A.
Figure 4G:
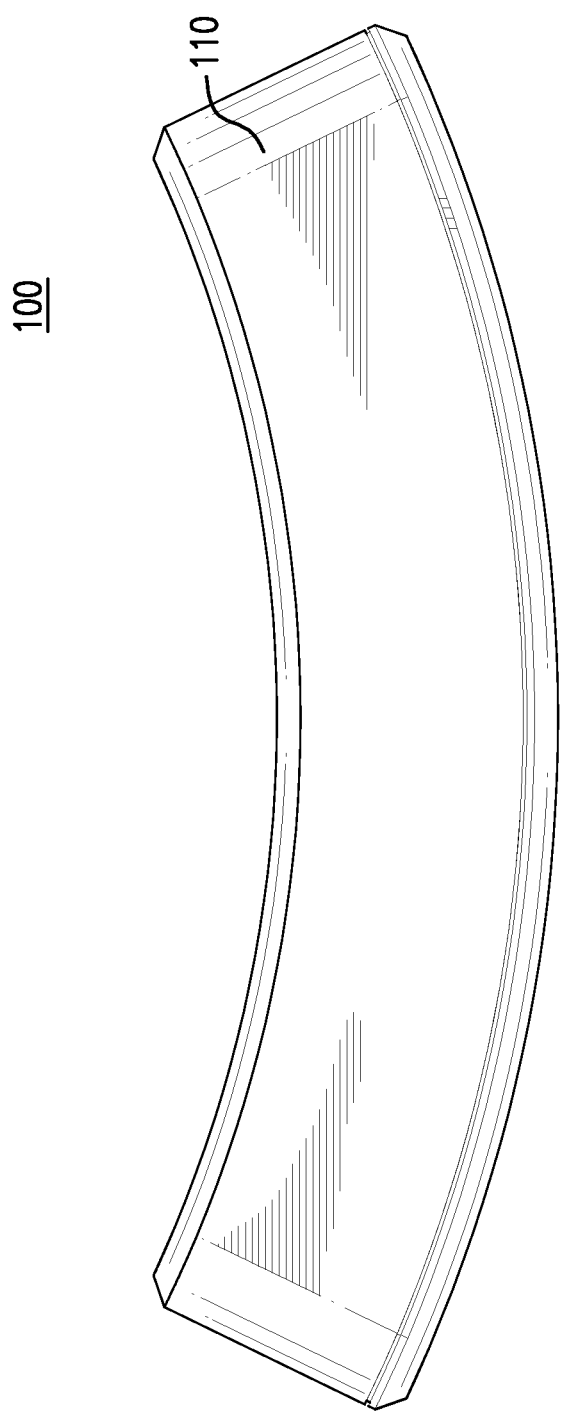
FIG. 4G is a top view of the portion of the electronic console shown in FIG. 4A.
Figure 4H:
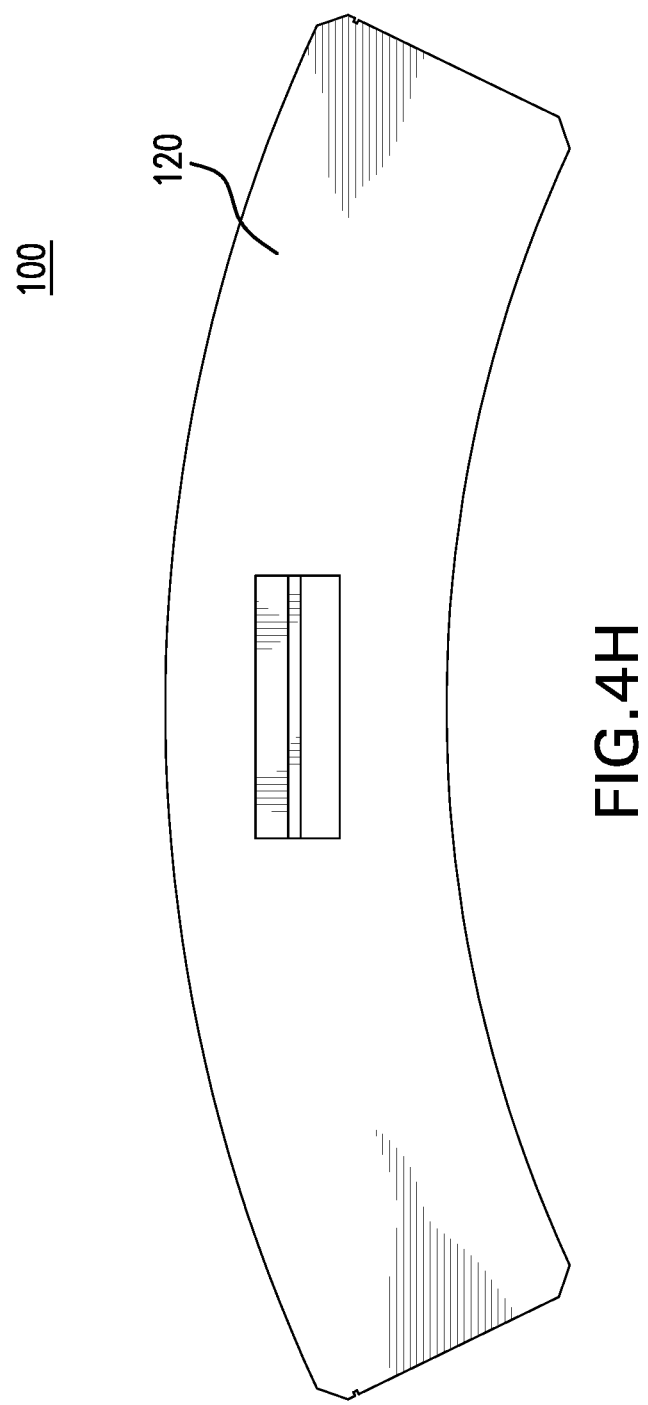
FIG. 4H is a bottom view of the portion of the electronic console shown in FIG. 4A.

FIG. 3A illustrates another configuration in which the battery portion 110, processing portion 120, and mobile dock portion 140 can be connected to form a mobile electronic console 100B. FIGS. 3B-D illustrate the mobile electronic console 100B included inside of a compartment 161 of an exemplary wearable carrier 160. In this example, the wearable carrier 160 is configured in a sling configuration 166. The wearable carrier 160 also can be configured in other configurations (e.g., backpack, waistband, belt, sleeve, etc.) as well. Regardless of the configuration, the wearable carrier 160 can include a compartment 161 for housing the mobile electronic console 100B. In the mobile electronic console 100B, users can play, or engage in, extended reality applications 1061 and/or other applications 1060 with unlimited mobility and without being restricted by the length of a wired connection.

In the exemplary sling configuration 166, one or more straps 167 are connected to the compartment 161, which permit the wearable carrier 160 to be worn on a user's torso region. For example, a portion of the one or more straps 167 may permit the wearable carrier to rest on a shoulder or neck portion of the user, and the one or more straps may extend around the user's front torso and back regions. In some embodiments, the sling configuration 166 may be outfitted with a second set of straps that are configured to extend around a user's waist region, which can help to further secure the wearable carrier 160 (and mobile electronic console 100B included therein) to the body of the user. In some embodiments, the wearable carrier 160 (including the compartment 161, straps 167, and/or second set of straps) can be constructed of a flexible material, e.g., such as cloth, fabric, leather, polyester, etc.

In the mobile electronic console 100B configuration, one or more HMDs 150 can be connected to either the wearable carrier 160 or mobile dock portion 140 using connectors 151 included on the HMDs 150. For example, as shown in FIGS. 7B-7D, the wearable carrier 160 can include one or more connectors 162 (e.g., one or more HMD connectors integrated into the one or more straps 167) that are configured to receive corresponding connectors 151 included on HMDs 150. One or more wire connectors 163 permit a connected HMD 150 to be powered by the mobile electronic console 100B (e.g., the battery portion 110), and permits data to be exchanged between the HMD 150 and the mobile electronic console 100B (e.g., the processing portion 120). Wire connectors may be integrated into or separable from HMD 150 or may be integrated into, or included within, the wearable carrier 160 (e.g., integrated into the one or more straps 167). In certain embodiments, wire connectors may supply both power and data (e.g., USB-C or Thunderbolt). In certain embodiments power and data may be separately supplied (high definition multimedia interface (HDMI), USB-A, power). In certain embodiments, a power dongle adapter may be connected between a dock portion of mobile electronic console 100 and an HMD 150 to allow for compatibility with proprietary HMD power connections. One or more processors 1010 and/or one or more video cards/GPUs 1025 included within the processing portion 120 of the mobile electronic console 100B can be configured to execute XR applications 1061 and/or other applications 1060, and generate video and audio content to be output by connected HMDs 150.

The mobile electronic console 100B configuration can be configured to operate in an XR mode 1051 (e.g., which executes XR applications 1061, video games, and/or other applications 161). Because the mobile electronic console 100B is included in the wearable carrier 160 and is able to be powered by the battery portion 110, an individual can move freely while engaging in the XR applications, video games, and/or other applications. In some embodiments, the mobile electronic console 100B also can be configured to operate in a desktop mode 1052 and/or TV mode 1053.

In certain embodiments, the mobile dock portion 140 can be integrated or attached to the wearable carrier 160. In some cases, the mobile dock portion 140 can be integrated into the wearable carrier 160 in a non-detachable manner (e.g., such that it is integrally connected to the wires 163 and connectors 162, and/or integrally connected to the compartment 161). In other cases, the mobile dock portion 140 can be detached and reattached from the wearable carrier 160. For example, the mobile dock portion 140 can be detached from a connector included on an end of the wires 163 and removed from the compartment 161.

In certain embodiments, the front surfaces (112c, 123c, 142c) and rear surfaces (112d, 123d, 142d) of the battery portion 110, processing portion 120 and mobile dock portion 140 can include a curvature (e.g., a U-shaped curvature). The curvature of these surfaces can be beneficial because they accommodate a user's body when the mobile electronic console 110B is equipped in the wearable carrier 160. For example, as shown in FIG. 3B, the curvature of battery portion 110, processing portion 120 and mobile dock portion 140 can accommodate a user's torso or mid-section, thereby permitting the wearable carrier to be to worn in a comfortable fashion.

Figure 5:
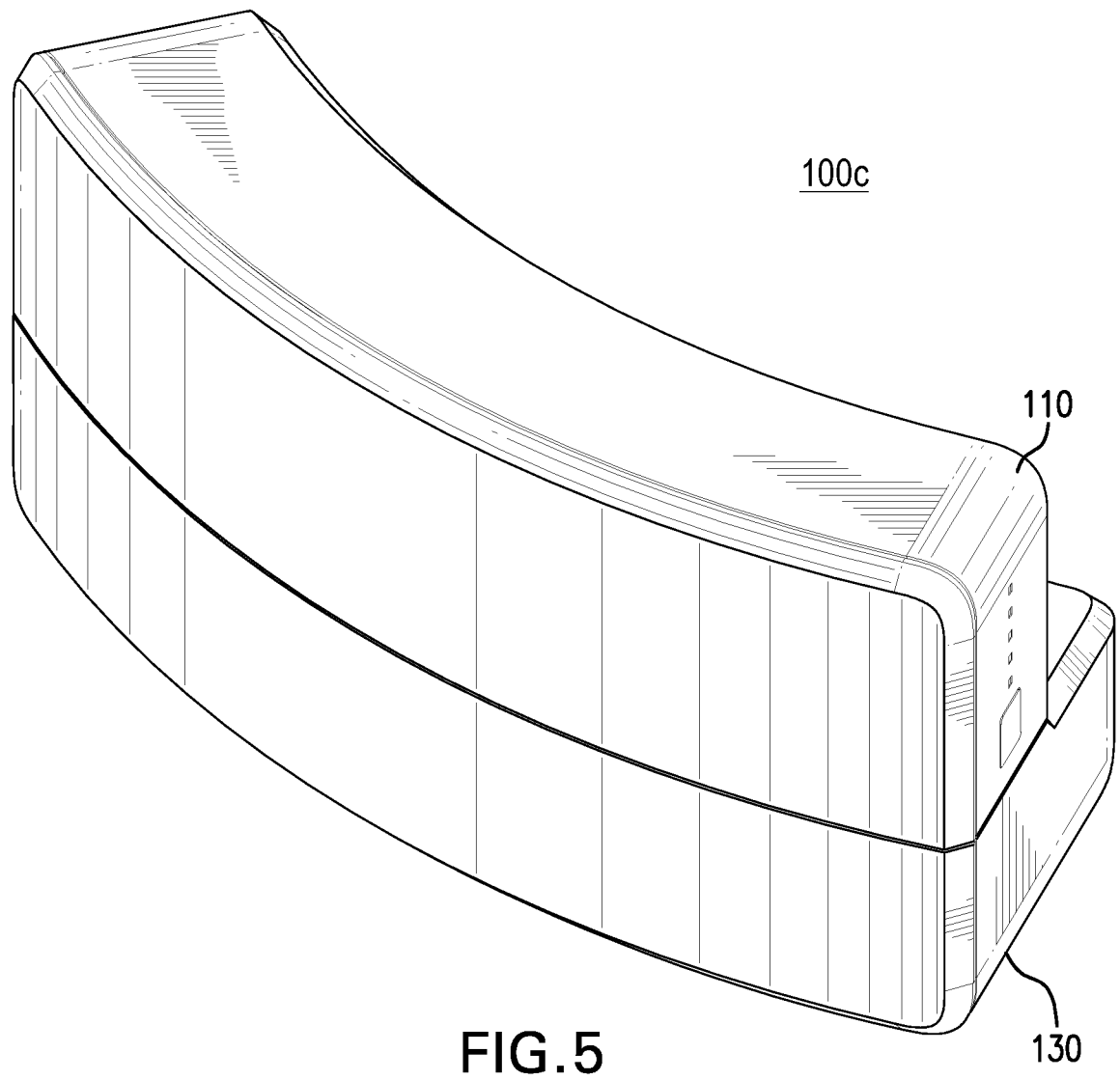
FIG. 5 illustrates a battery portion of an electronic console connected to a desktop dock portion according to certain embodiments.
Figure 6A:
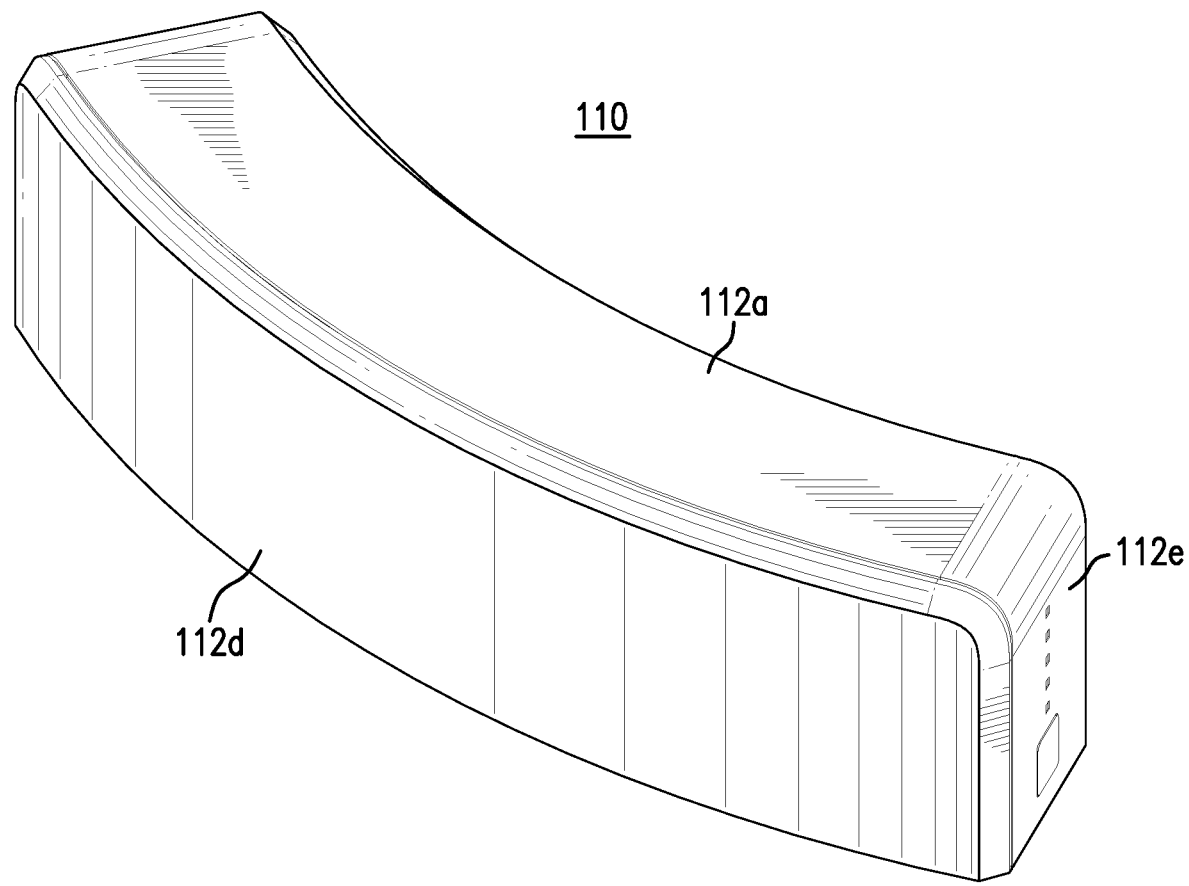
FIG. 6A is a front perspective view of a battery portion of an electronic console in accordance with certain embodiments.
Figure 6B:
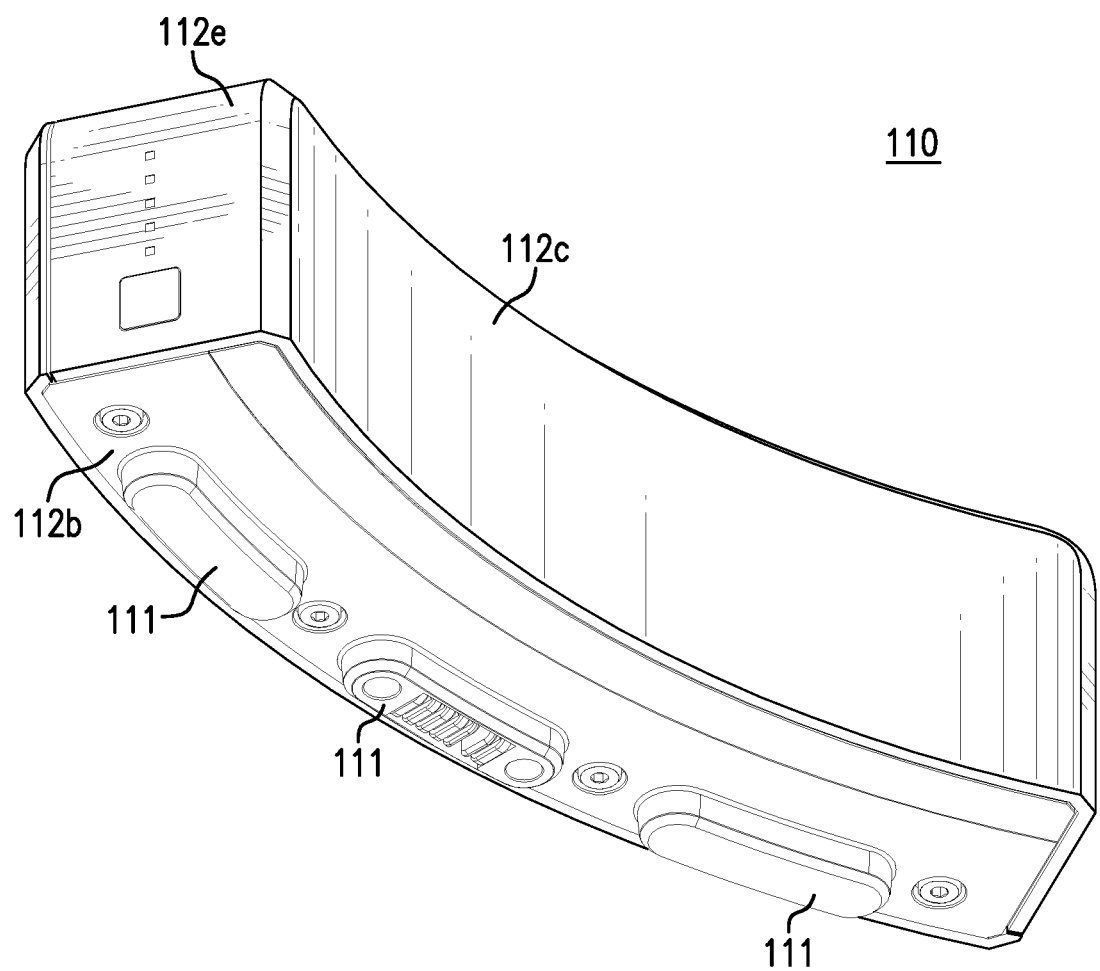
FIG. 6B is a rear perspective of the battery portion shown in FIG. 6A.
Figure 6C:
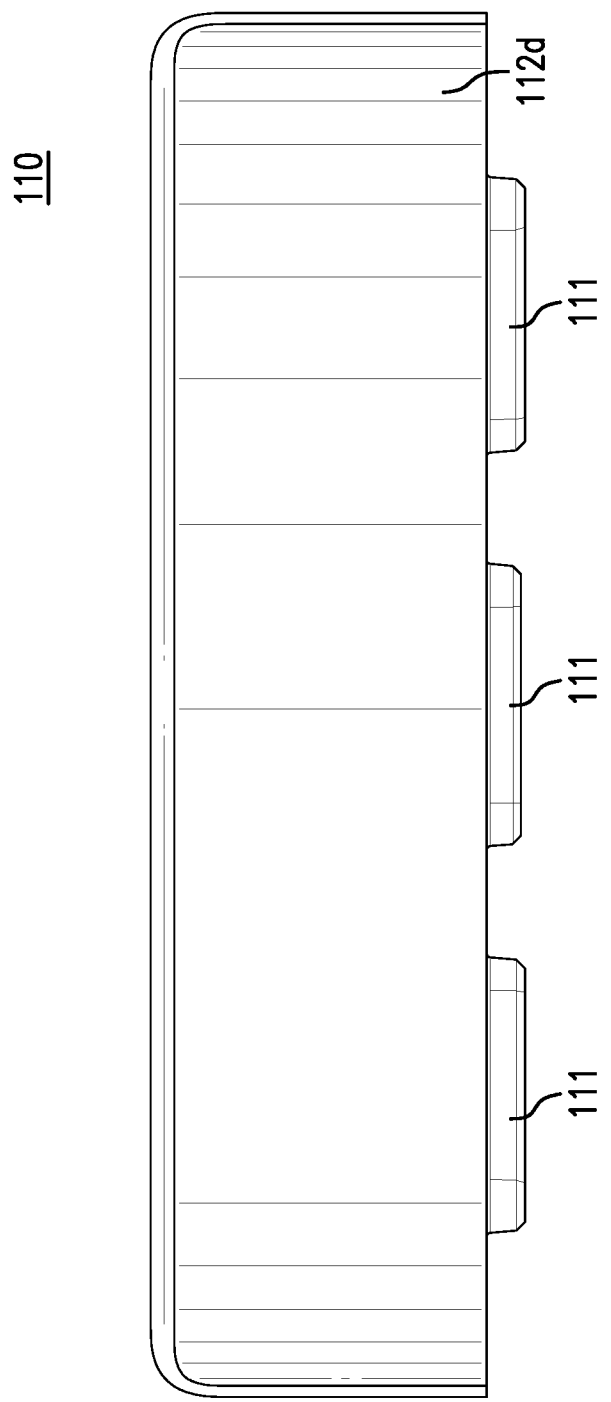
FIG. 6C is a front view of the battery portion shown in FIG. 6A.
Figure 6D:
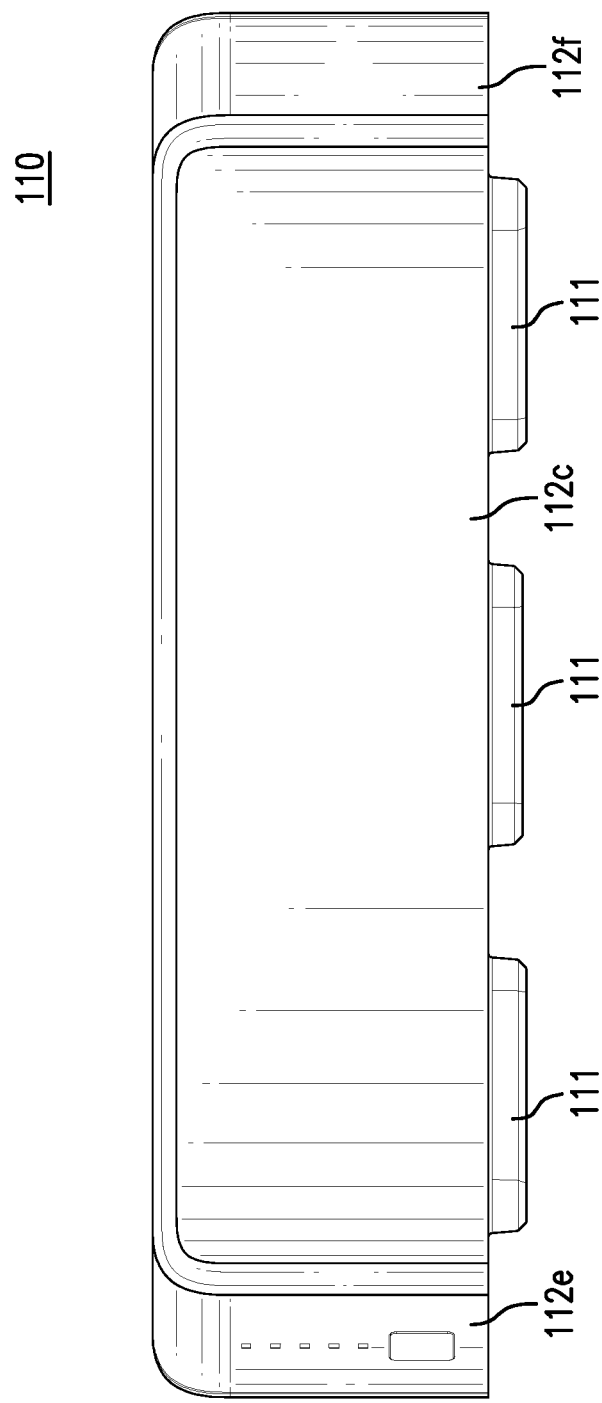
FIG. 6D is a rear view of the battery portion shown in FIG. 6A.
Figure 6E:
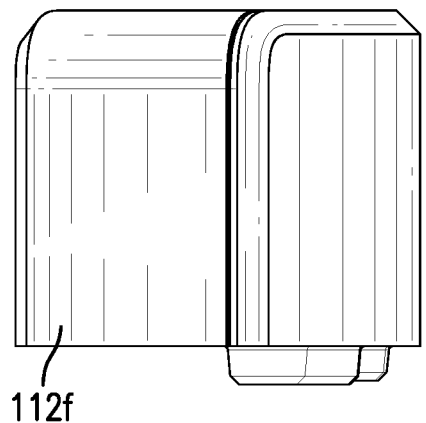
FIG. 6E is a side view of the battery portion shown in FIG. 6A.
Figure 6F:
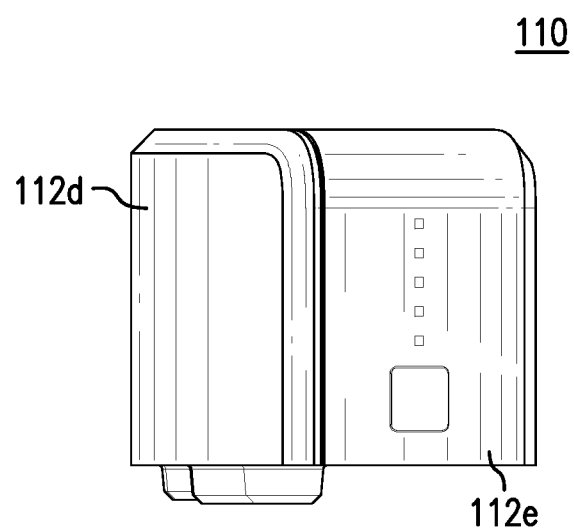
FIG. 6F is an opposite view of the battery portion shown in FIG. 6A.
Figure 6H:
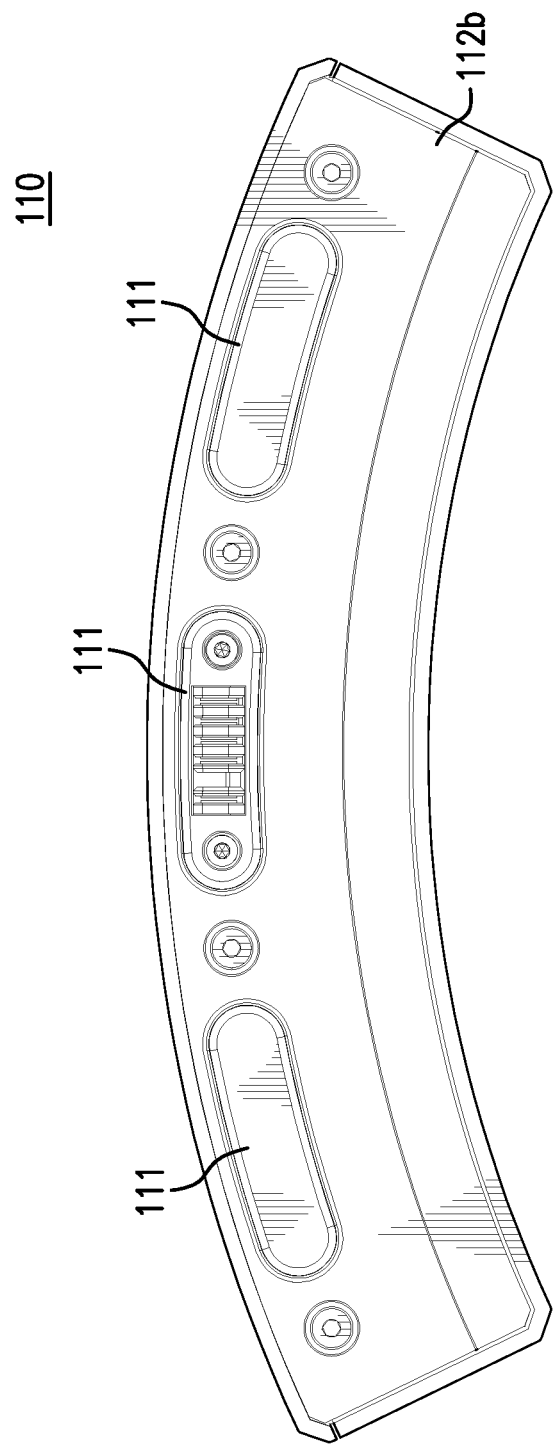
FIG. 6H is a bottom view of the battery portion shown in FIG. 6A.

The modular components in FIG. 1A can be arranged in other configurations as well (in addition to the electronic desktop configuration 100A and mobile electronic configuration 100B). For example, FIGS. 4A-4H show an embodiment of an electronic console 100 that only includes a battery portion 110 and a processing portion 120. FIG. 5 shows an embodiment of an electronic console 100 in which the battery portion 110 is connected to a desktop dock portion 130. In this charging configuration 100c, the battery portion 110 is capable of being charged when the desktop dock portion 130 is connected to a wall outlet and/or AC outlet. The battery portion 110 also is capable of being charged when the desktop dock portion 130 and/or mobile dock portion 140 is connected to a wall outlet and/or AC outlet in other configurations (e.g., such as the configurations such shown in FIGS. 2A-2H and/or 3A-3D). Other configurations of the modular components in FIG. 1A are also possible.

In certain embodiments, the electronic console 100 also can be arranged in mobile and desktop configurations that do not include a battery portion 110 (e.g., when the desktop dock portion 130 and/or mobile dock portion 130 is plugged into a wall outlet and supplied continuous energy). When arranged in these configurations, the connectors 121 included on the top surface of the processing portion 120 may be exposed. To prevent these connectors 121 from being exposed or damaged, a cap or cover can be connected to the top surface of the processing portion 120 which seals or encloses the connectors 121. For example, the cap or cover may include the same physical configuration as the bottom of surface of the battery portion 100 (e.g., may include male connectors and/or magnets that mate with the connectors 121 on the processing portion 120). The cap or cover can be attached to the connectors 121 to protect them from damage or exposure.

Returning to FIGS. 1A and 1B, additional details of the battery portion 110, processing portion 120, desktop dock portion 130, mobile dock portion 140, head-mounted device/display (HMD) 150, and wearable carrier 160 are provided below.

The battery portion 110 includes one or more batteries (e.g., battery cells) inside of a housing 112. The housing includes a top surface 112a, bottom surface 112b, front surface 112c, rear surface 112d, first side surface 112e, and second side surface 112f (see FIGS. 6A-6H). In some embodiments, the battery portion 110 may include four battery cells. The first side surface 112e of the housing 112 includes a power indicator (e.g., light emitting diodes or LEDs) that indicates a remaining battery life, and a power button for activating and deactivating the batteries and/or activating and deactivating an assembly electronic gaming console. The bottom surface 11b of the housing 112 includes one or more connectors 111. The one or more connectors 111 can enable the battery portion 110 to be connected the processing portion 120, desktop dock portion 130, and/or mobile dock portion 140.

FIGS. 6A-6H illustrate an exemplary embodiment of a battery portion 110 according to certain embodiments. In this configuration, the battery portion 110 includes three connectors 111. The connectors permit the battery portion 110 to connect with surfaces included on the processing portion 120, desktop dock portion 130, and/or mobile dock portion 140. A central connector provides a power connection that is able to provide power to the electronics included on any components directly or indirectly connected to the battery portion (including the processing portion 120, desktop dock portion 130, and mobile dock portion 140, and any HMDs 150 connected to the desktop dock portion 130 and mobile dock portion 140).

The other connectors 111 (located on the left and right on the bottom surface) included on the battery portion 110 can assist with physically or mechanically coupling the battery portion 110 to the processing portion 120, desktop dock portion 130, and/or mobile dock portion 140. In certain embodiments, these connectors can include magnets that are configured to latch to oppositely charged magnets included in or near corresponding connectors (121, 131, 141) of the processing portion 120, desktop dock portion 130, and/or mobile dock portion 140.

Returning to FIGS. 1A and 1B, the processing portion 120 includes one or more processors 1010 and one or more storage devices 1020 inside of a housing 123. The housing 123 includes a top surface 123a, bottom surface 123b, front surface 123c, rear surface 123d, first side surface 123e, and second side surface 123f (see FIGS. 2A-2D, 3A, and 4A-4B). In certain embodiments, the one or more processors 1010 and/or one or more storage devices can be included on a processing module that has sufficient processing power to execute XR applications 1061, including virtual reality applications, augmented reality applications, and/or mixed reality applications. For example, in some cases, the processing portion 120 can include a Jetson TX2 Module offered by NVIDIA®, which can include a graphics processor unit (GPU), one or more computing central processing units (CPUs), one more memory storage devices, and a high-memory bandwidth.

The processing portion 120 can include other configurations of processors 1010 and storage devices 1020 as described below. In some embodiments, the one or more processing devices 1010 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more video cards 1025 can include one or more display cards, one or more graphics cards, one or more GPUs, one or more video boards, one or more video controllers, and/or other devices that perform similar functions. The one or more processors 1010 and one or more video cards 1025 may be integrated in a single device and/or may be separate devices.

In some embodiments, the one or more storage devices 1020 included in the processing portion 120 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices can be physical, non-transitory mediums.

The top surface 123a of the housing 123 includes one or more connectors 121 that are configured to facilitate connection of the battery portion 110. As mentioned above, in some embodiments, the battery portion 110 includes three connectors 111 (e.g., three male connectors) and the processing portion 120 includes three connectors 121 (e.g., three female connectors) that facilitate the connection between the connectors 121 on the processing portion 120 and the connectors 111 on the battery portion.

As mentioned above, one or more connections established by the connectors (111, 121) can provide power from the battery portion 110 to the processing portion 120 (as well as a desktop dock portion 130 and/or mobile dock portion 140 that is connected on an opposite surface (e.g., bottom surface 123b) of the processing portion 120, and any HMDs 150 connected to either of the dock portions). For example, the connection established by the center connectors (111, 121) can include a power connection between the battery portion 110 and processing portion 120. This connection also can be used to provide power to any peripherals and/or devices connected to the desktop dock portion 130 and/or mobile dock.

One or more of the connections established by the connectors (111, 121) also can provide a physical connection that physically or mechanically secures the battery portion 110 and processing portion 120 together. In certain embodiments, two of the connections established by the connectors (111, 121) can establish magnetic connections that can be used to physically secure the battery portion 110 and processing portion 120 together. For example, a portion of the connectors 111 included on the battery portion 100 can include magnets that are configured to latch with magnets included in the connectors 121 on the processing portion 120.

This magnetic connection mechanism can be advantageous because it facilitates easy removal or detachment of the battery portion 110 from the processing portion 120 when desired (e.g., when swapping battery portions 110), while providing a secure connection between the two portions when desired (e.g., when executing XR applications and/or other applications). Other types of connectors (e.g., fitted connectors, hoop-and-loop connectors, press fit connectors, snap connectors, etc.) also can be used to physically or mechanically connect the battery portion 110 and processing portion 120.

The processing portion 120 can execute hot swappable battery functions 1040 that enable battery portions 110 to be replaced in a hot swap fashion. For example, when a user is utilizing the mobile electronic configuration 100B and/or other configuration of the electronic console 100 that is not connected to a wall outlet, the user is able to swap a connected battery portion 110 with a new battery portion 110 that is charged. During the swapping of the battery portions 110, the processing portion 120 is able to transition from an active mode 1041 to a standby mode 1042, which saves and pauses the state 1063 of the extended reality application 1061 and/or other application 1060 being executed. In the standby mode 1042, power may be discontinued to any HMDs 150 connected to the electronic console and the one or more processors 1010 in the processing portion 120 may operate in a reduced power consumption state 1011. After a new battery portion 110 is connected, the user can then resume the extended reality application 1061 and/or other application 1060. Transitioning to a standby mode generally allows a smaller energy storage capacity (e.g., battery or supercap) incorporated in the processing portion to be activated and/or utilized to power the electronic console. However, larger energy storage capacity may be incorporated in the processing portion 120 to avoid standby mode or increase swap times.

The hot swappable battery function 1040 can be executed or activated in various scenarios. In one exemplary scenario, the hot swappable battery function 1040 can be activated when a user is swapping or replacing a battery portion 120 connected to the electronic console with a second battery portion 120 (e.g., that is charged). In another exemplary scenario, the hot swappable battery function 1040 can be executed or activated in a reserve battery capacity scenario in response to detecting that the charge in a connected battery portion 120 is completely drained or depleted. In a further exemplary scenario, the hot swappable battery function 1040 can be executed or activated in response to a battery portion 120 becoming accidentally disconnected from the electronic console. In any of the aforementioned scenarios, an interrupt signal 1044 may be generated (e.g., by a by a general purpose input/output or GPIO) which causes the hot swappable battery function 1040 to be executed.

After the user connects a new battery portion (or re-connects the original battery portion), the processing portion and/or electronic console can transition back to the active mode 1041 from the standby mode 1042. Transitioning back from to the active state 1041 can include resuming operation of the one or more processors 1010 in a normal power consumption state, resuming operations of any connected HMDs 150, and enabling an extended reality (or other application) application 1061 to be resumed from the saved state 1063.

Figure 8A:
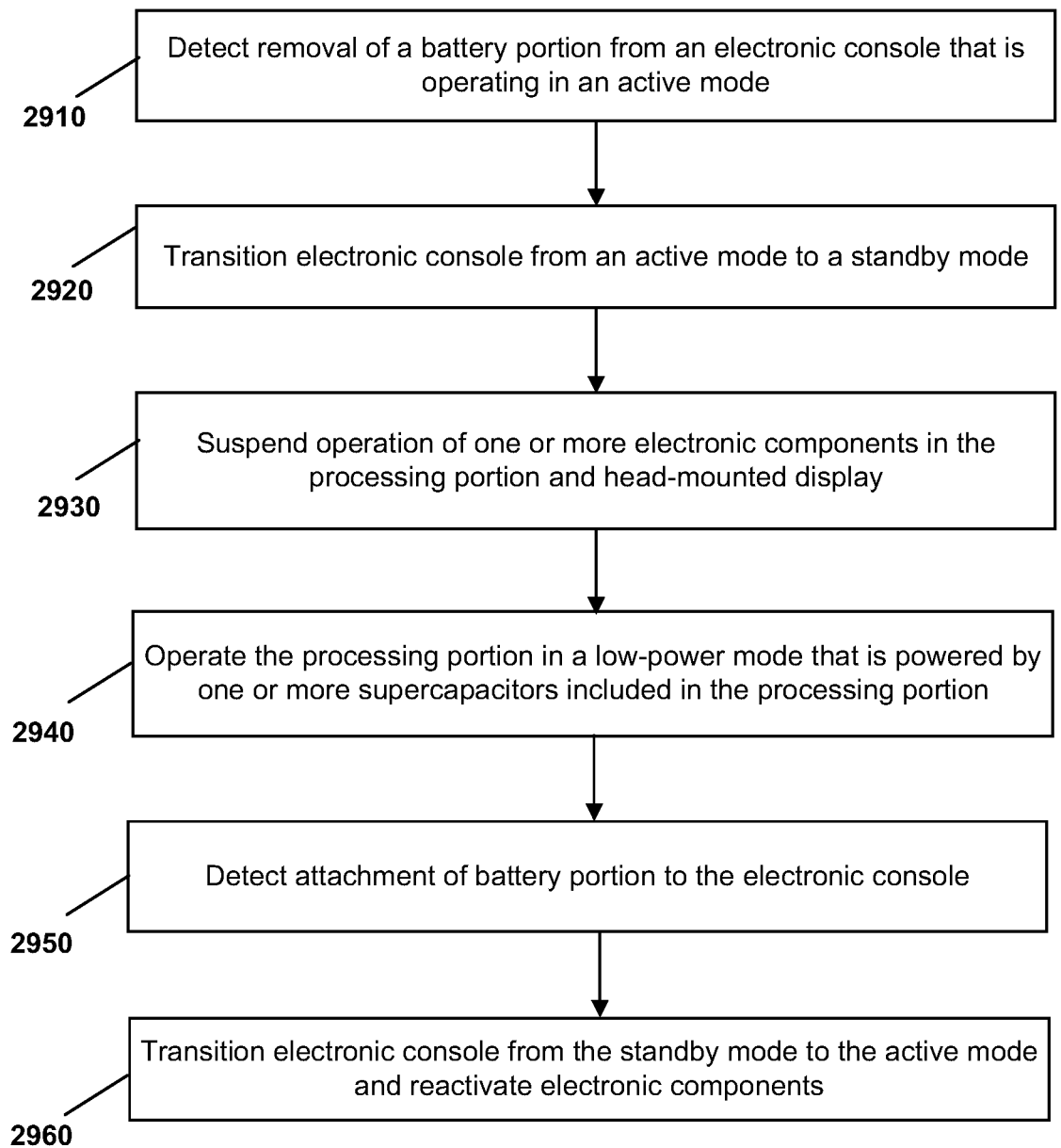
FIG. 8A is a flow chart illustrating a method for providing hot swappable battery functionality according to certain embodiments.

FIG. 8A illustrates a flow chart for a method 2900 for implementing a hot swappable battery function 1040 according to certain embodiments. Method 2900 is merely exemplary and is not limited to the embodiments presented herein. Method 2900 can be employed in many different embodiments or examples not specifically depicted or described herein. In some embodiments, the activities of method 2900 can be performed in the order presented. In other embodiments, the activities of method 2900 can be performed in any suitable order. In still other embodiments, one or more of the activities of method 2900 can be combined or skipped. In many embodiments, processing portion 120 and/or a processing module included within processing portion 120 can be suitable to perform method 2900 and/or one or more of the activities of method 2900. In these or other embodiments, one or more of the activities of method 2900 can be implemented as one or more computer instructions configured to run at one or more processors 1010 (e.g., a Jetson TX 2 Module) and configured to be stored at one or more memory storage devices 1020. Such memory storage modules can be part of an electronic console 100, such as mobile electronic console 100B.

In step 2910, removal of a battery portion 110 from an electronic console 100 (e.g., a mobile electronic console 100B) is detected when the electronic console 100 is operating in an active mode 1041 (e.g., an active XR mode 1051). In certain embodiments, the removal of the battery portion 110 may be detected in response to the processing portion 120 receiving or detecting an interrupt signal 1044 (e.g., which may be generated by a general purpose input/output or GPIO when the battery portion 110 is removed). In the active mode 1041, a user may be engaging in an XR application 1061 (e.g., playing a virtual reality game) and/or other application 1060. A user may pause the application 1060 before removing the battery portion 110 and/or the application 1060 can be automatically paused in response to removing the battery portion 110.

In step 2920, the electronic console transitions from the active mode 1041 to a standby mode 1042. The standby mode 1042 can enable the electronic console 100 to operate without the battery portion 110 in a reduced power consumption state 1011. For example, in some cases, a processing board (e.g., a TX2 Module or other processing module) included in the processing portion 120 can include a battery that enables the electronic console to operate in the standby mode 1042 and/or reduced power consumption state 1011.

In step 2930, operation of one or more electronic components in the processing portion 120 and/or a HMD 150 is suspended. For example, the functionality of a processing module can operate in a low-power state, and any video cards 1025 and display units included in the head-mounted display 150 can be suspended and/or operated in a low-power state.

In step 2940, the processing portion 120 is operated in a low-power mode or reduced power consumption state 1011 that is powered by one or more batteries or supercapacitors 1043 (or other energy storage elements) included in the processing portion 120. In some cases, the supercapacitors 1043 can be included on a Jetson TX 2 module and/or other processors 1010 included in the processing portion 120.

In step 2950, attachment of a battery portion 110 to the electronic console 100 is detected. For example, in some cases, a user may attach a new battery portion 110 that is fully, or at least partially, charged to electronic console 100. In another example, a user may reattach a battery portion that was accidentally disconnected during usage of the electronic console.

In step 2960, the electronic console 100 is transitioned from the standby mode 1042 to the active mode 1041 and electronic components (e.g., HMD display, video card 1025, processor 1010, etc.) are reactivated. After the electronic components are reactivated and operated in a normal power state 1012, the hot swappable battery function 1040 permits the user to resume playing, or engaging in, the application 1060 that was paused or interrupted. The user may resume the application 1060 from a game state 1063 that was saved when the battery portion 110 was disconnected. In certain embodiments, to allow for subsequent (additional) swaps of battery portions 110, in response to attachment of a battery portion 110, batteries or supercapacitors 1043 (or other energy storage elements) that were discharged during the time between removal and reattachment of battery portion 110 begin recharging from the energy stored in battery portion 110.

Returning to FIGS. 1A and 1B, a bottom surface 123b on the housing 123 of the processing portion 120 also can include one or more connectors 122. The connectors 122 included on the bottom surface 123b can enable the processing portion 120 to be coupled to both the desktop dock portion 130 and the mobile dock portion 140. In some embodiments, the bottom surface 123b on the housing 123 includes a single connector 122 that provides a power and data connection to downstream components (e.g., a desktop dock portion 130, a mobile dock portion 140, an HMD 150, and/or any connected peripherals). In other cases, the bottom surface 123b on the housing 123 includes multiple connectors 122 (e.g., multiple female connectors and/or multiple male connectors).

The desktop dock portion 130 includes a housing 132. The housing 132 includes a top surface 132a, bottom surface 132b, front surface 132c, rear surface 132d, first side surface 132e, and second side surface 132f (see FIGS. 1A, 2A-2D, and 3A). The top surface 132a of the housing 132 includes one or more connectors 131. Similarly, the mobile dock portion 140 includes a housing 142 comprising includes a top surface 142a, bottom surface 142b, front surface 142c, rear surface 142d, first side surface 142e, and second side surface 142f (see FIG. 3A). The top surface 142a of the housing 142 includes one or more connectors 141. The connectors 122 included on the bottom surface 123b of the processing portion 120 can be configured to connect with the connectors 131 included on the desktop dock portion 130 and the connectors 141 included on the mobile dock portion 140.

In certain embodiments, at least one of the connections established between the between the connectors (122, 131) on the processing portion 120 and the desktop dock portion 130 permit data and power to be exchanged between the two components, as well as any HMDs 150, peripherals, and/or other devices connected to the desktop dock portion 130. In some embodiments, at least one of the connections established between the connectors (122, 131) also can provide a physical connection that physically or mechanically secures the processing portion 120 and desktop dock portion 130 together. For example, a magnetic connection and/or other type of physical connection can be used to secure the processing portion 120 and desktop dock portion 130 together in the same manner discussed above.

Similarly, at least one of the connections established between the between the connectors (122, 141) on the processing portion 120 and the mobile dock portion 140 permit data and power to be exchanged between the two components, as well as any HMDs 150, peripherals, and/or other devices connected to the mobile dock portion 140. In some embodiments, at least one of the connections established between the connectors (122, 141) also can provide a physical connection that physically or mechanically secures the processing portion 120 and mobile dock portion 140 together (e.g., using a magnetic connection and/or other type of physical connection).

Both the desktop dock portion 130 and the mobile dock portion 140 can be equipped with various connection interfaces 133, e.g., such as input/output (I/O) connectors, power input connectors, network connectors, and/or data interfaces. In some cases, the connection interfaces can be located on front or rear surfaces of the desktop dock portion 130 and the mobile dock portion 140 (e.g., surfaces 132c and 142c). Exemplary connection interfaces 133 can include one or more HMD connectors (133*a*, 133*e*) that enable one or more HMDs 150 to be connected, one or more network connectors (133*d*, 133*f*) (e.g., for receiving Ethernet connectors, television set top box connectors, modem connectors, subscriber identity module (SIM), etc.), one or more display connectors (133*e*) (e.g., high-definition multimedia interface (HDMI)), one or more universal serial bus (USB) connectors (133*a*, 133*b*), one or more memory card connectors (e.g., one or more micro secure digital or SD card slots) and/or one or more power connectors (133*c*) (e.g., that can connect to wall outlet or AC outlet to power the electronic gaming console and/or recharge the battery portion 110). In certain embodiments, the dock portions (130, 140) and/or other portion of the electronic consoles 100 can include wireless connection interfaces and/or hardware (e.g., transceivers, transmitters, receivers, Bluetooth® communication modules, Wi-Fi® communication modules, cellular 4G/5G, etc.). The particular types of connection interfaces included on the desktop dock portion 130 and the mobile dock portion 140 can vary.

In certain embodiments, the mobile dock portion 140 and desktop dock portion 130 at least includes one or more HMD connectors that enable connection of one or more HMDs 150, and which facilitate exchange of data and/or power between the HMDs 150 and the processing portion 120. The desktop dock portion 130 may include additional connection interfaces that enable the electronic console 100 to be utilized as a desktop computer and/or television set top box. For example, the desktop dock portion 130 may include one or more USB connectors or other connectors that enable attachment of peripheral devices (e.g., computer monitors, input/output devices, printers, etc.), and one or more network connectors (e.g., Ethernet connectors) that enable the electronic gaming console to access and exchange information over a network (e.g., over the Internet). Additionally, or alternatively, the desktop dock portion 130 may include one or more television network connectors that enable the electronic console to access and exchange information over one or more television networks, and one or more display (e.g., HDMI) connectors or other connectors that can be connect to a television device or monitor that displays video and audio content (e.g., television programs received over a television network).

Figure 10A:
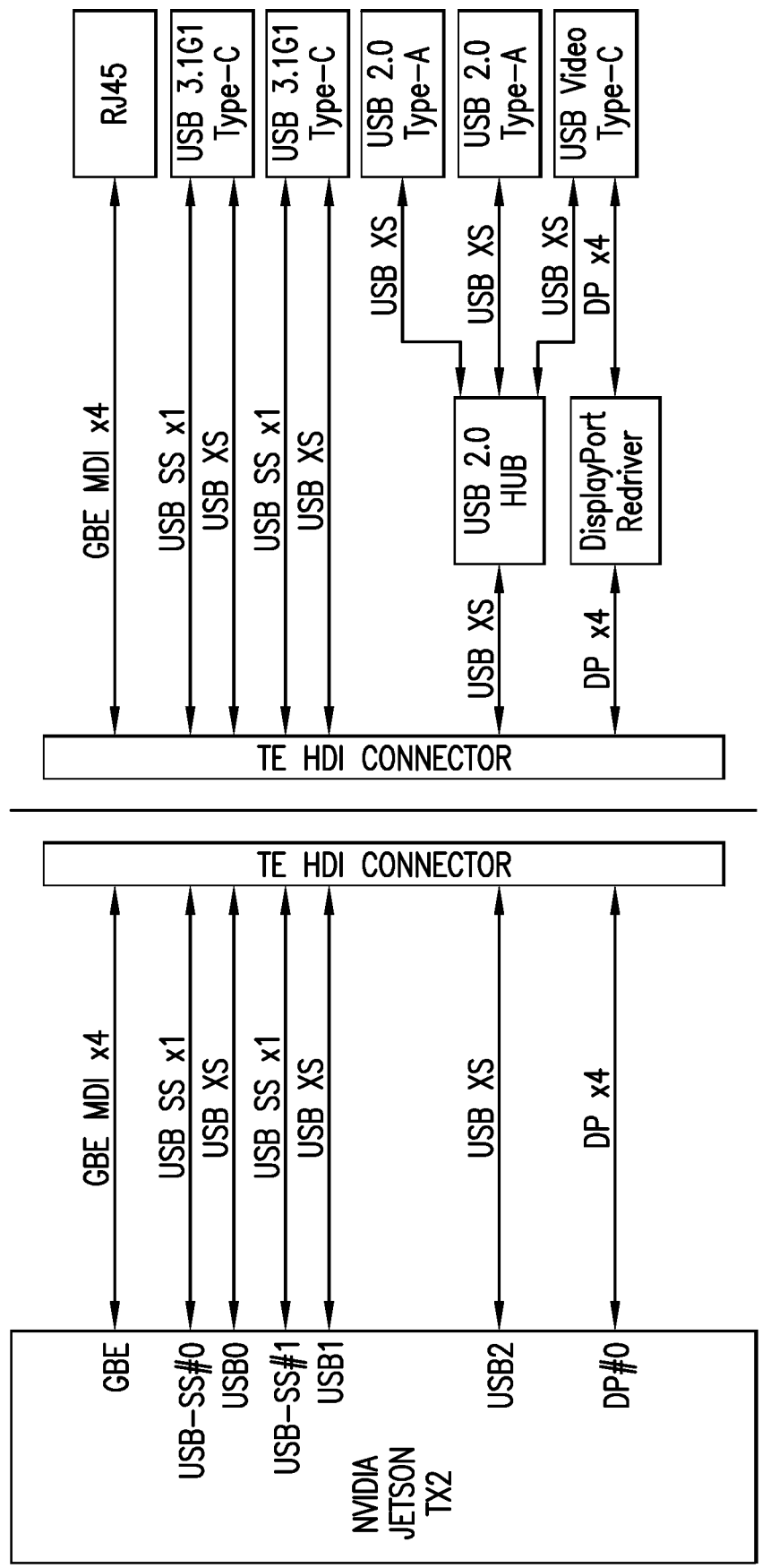
FIG. 10A is a block diagram illustrating exemplary connectors that may be included on a desktop dock portion and exemplary connection paths between the desktop dock portion and a processing portion according to certain embodiments.
Figure 10B:
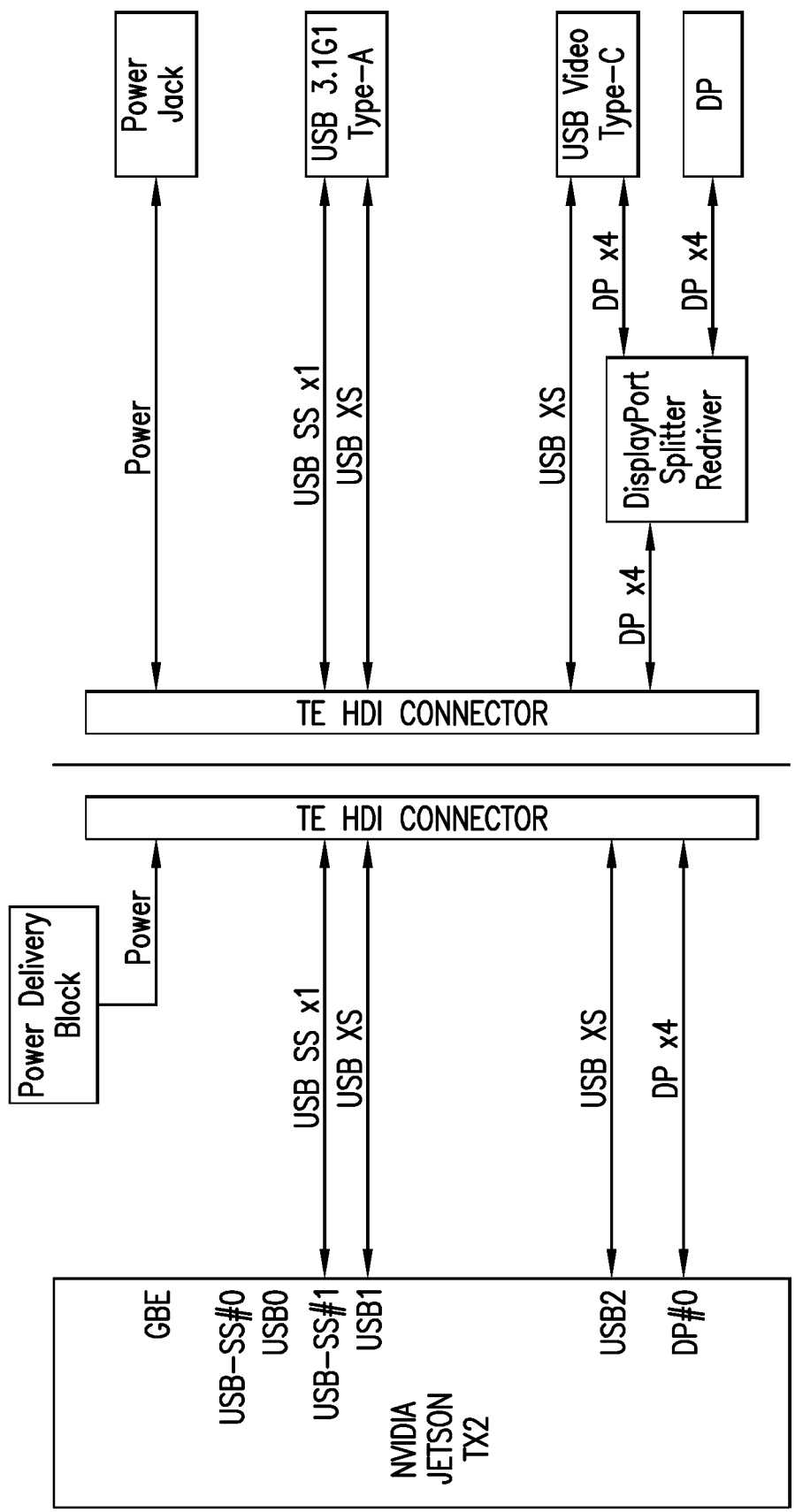
FIG. 10B is a block diagram illustrating exemplary connectors that may be included on a mobile dock portion and exemplary connection paths between the mobile dock portion and a processing portion according to certain embodiments.
Figure 10C:
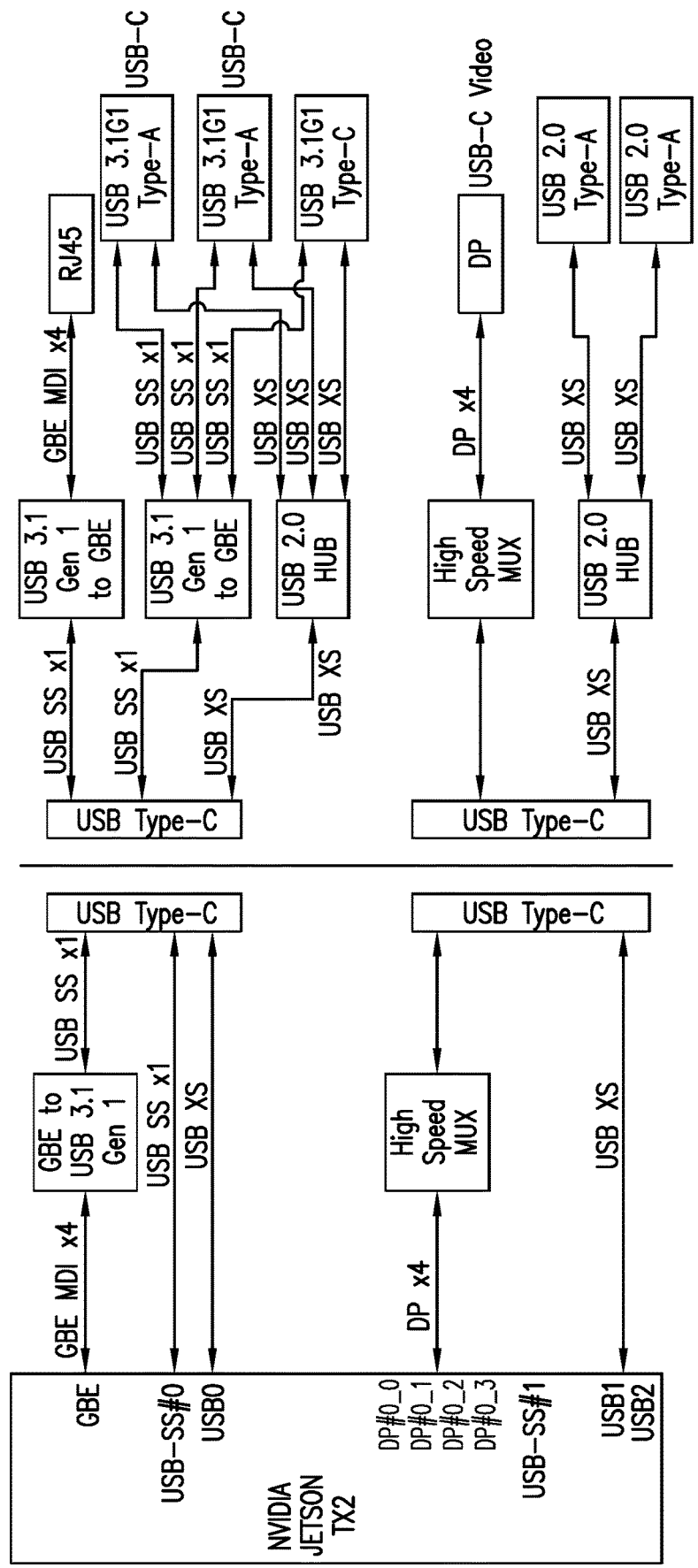
FIG. 10C is a block diagram illustrating exemplary connectors that may be included on a desktop dock portion and exemplary connection paths between the desktop dock portion and a processing portion according to certain embodiments.
Figure 10D:
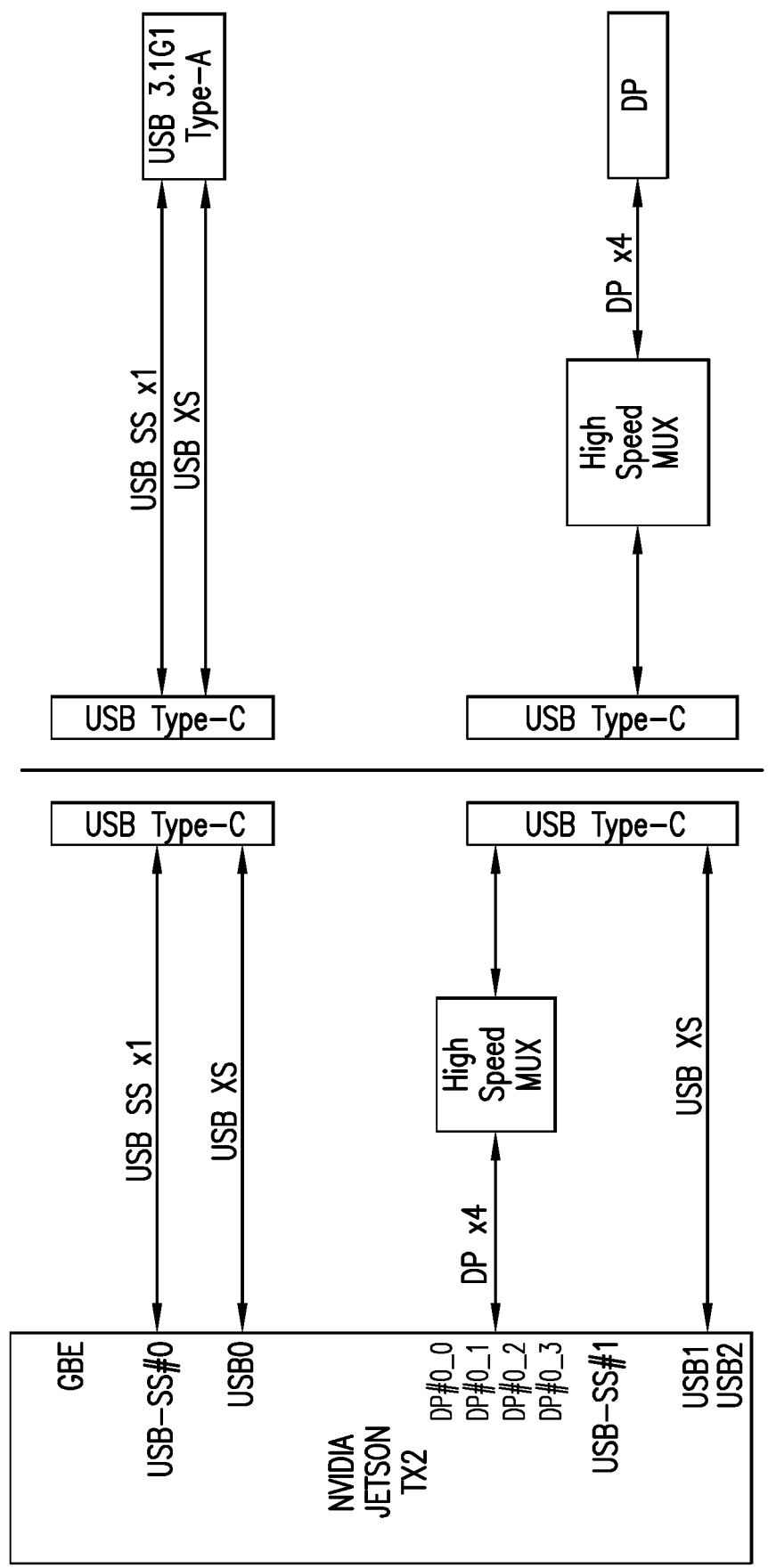
FIG. 10D is a block diagram illustrating exemplary connectors that may be included on a mobile dock portion and exemplary connection paths between the mobile dock portion and a processing portion according to certain embodiments.

FIGS. 10A and 10C disclose exemplary connectors that may be included on a desktop dock portion 130 and exemplary connection paths between the desktop dock portion 130 and the processing portion 120. FIGS. 10B and 10D disclose exemplary connectors and that may be included on a mobile dock portion 140 and exemplary connection paths between the mobile dock portion 140 and the processing portion 120.

As explained above, the mobile dock portion 140 can be integrated into, or attached to, a wearable carrier 160. A mobile electronic console 100B can be formed by connecting a processing portion 120 and battery portion 110 to the mobile dock portion 140 included in the wearable carrier 160. As mentioned above, this configuration can permit a user to freely move while engaging in virtual reality games or applications, augmented reality games or applications, mixed reality games or applications, and/or other games or applications. When the battery life of the battery portion 110 is depleted or drained, the user can hot swap and replace the battery portion 110 with a second battery portion 110 that is charged, and thereafter resume playing the game and/or application being executed substantially without interruption.

In certain embodiments, the electronic consoles 100 permit varying types and models of HMDs 150 to be connected to the mobile dock portion 140 and desktop dock portion 130.

The hardware and software associated with HMDs 150 can vary. Each HMD 150 also can include, or be connected to, a head-based structure (e.g., a helmet structure, eyewear structure, visor structure, headsets, eyeglass structure, etc.) that permits the HMD 150 to be worn on a user's head or facial region. In certain embodiments, each of the HMDs can include one or more optic displays (e.g., monocular or binocular displays) that output computer generated image and/or video content. Each of the HMDs 150 may include one or more sensors (e.g., sensors that can track movements of a user's position, head, and/or body, such as an IMU and/or light sensor). Each of the HMDs 150 also may include one or more video cards, one or more GPUs, one more CPUs, and/or one or more storage devices. Each of the HMDs 150 also may include one or more batteries and/or one or more power input connections for powering the HMD 150. Each of the HMDs 150 also may be associated with one or more hardware driver applications that can be used to control the functionality of the HMDs 150.

In certain embodiments, the electronic consoles 100 described herein can include a dynamic device manager 1030 that permits a wide variety of HMDs 150 to be connected to, and utilized in connection with the electronic consoles 100. For example, the power requirements or settings 1031, video settings 1032, data requirements or settings 1033, and sensor configurations or settings 1034 of HMDs 150 can vary significantly across different models and brands. To address these varying configurations and settings, the dynamic device manager 1030 can detect (e.g., via plug-and-play) the type or model of a HMD 150 connected to the electronic console (e.g., connected to a desktop dock portion 130 and/or mobile dock portion 140). After detecting the type or model of a connected HMD 150, the dynamic device manager 1030 can automatically configure and adjust power settings 1031, video settings 1032, data settings 1033 and/or sensor settings 1034 to accommodate and/or facilitate usage of the connected HMD 150 with the electronic console 100. In some cases, the dynamic device manager 1030 and/or processing portion 120 may store extended display identification data 1035 (EDID) that includes the settings (e.g., power, video and/or sensor settings) for each of a plurality of HMDs 150. In response to detecting a type of model of a connected HMD 150, the dynamic device manager 1030 can retrieve the EDID 1035 associated with the connected HMD 150 and configure the electronic console 100 accordingly. In this manner, the dynamic device manager 1030 permits users to easily connect and use different HMDs 150 without manually configuring the electronic console 100.

In some embodiments, the electronic consoles described herein can be configured to execute one or more cross-platform applications 1062. A cross-platform application 1062 can represent an application or game that is capable of being executed in two or mode operational modes 1050. For example, one type of cross-platform application 1062 can be executed both in an XR mode 1051 and desktop mode 1052. When executed in the XR mode 1051 (e.g., using the mobile electronic console 100B configuration), a user can utilize a HMD 150 to interact with the cross-platform application 1062 and, in some cases, can interact with the cross-platform application 1062 in a virtual reality, mixed reality, and/or augmented reality environment. When executed in a desktop mode 1052 (e.g., using the electronic desktop console 100B configuration), a user can utilize peripherals (e.g., computer monitors, mouse devices, keyboards) and/or other devices connected to the desktop dock portion 130 to interact and utilize the cross-platform application 1060.

The processing portion 120 and/or electronic consoles described herein can enable the games and/or applications to be accessed in multiple operational modes 1050. Additionally, the states of the games and/or applications can be saved in one operational mode 1050, and then accessed and resumed in one or more additional operational modes 1050. For example, when a cross-platform application 1062 is operated in an XR mode 1051, a user may save the state of the cross-platform application 1062 and resume playing the cross-platform application 1062 in a desktop mode 1052. Similarly, when a cross-platform application 1062 is operated in a desktop mode 1052, a user may save the state of the cross-platform application 1062 and resume playing the cross-platform application 1062 in the XR mode 1051.

In certain embodiments, the processing portion 120 is configured to detect whether it is connected to a desktop dock portion 130 or mobile dock portion 140, and to automatically transition to a designated operational mode 1050 depending on which dock portion is connected. For example, in some embodiments, when the processing portion 120 detects that a desktop dock portion 130 is connected (e.g., in a desktop electronic configuration 100A), the electronic console 100 may automatically transition to a desktop mode 1052. Likewise, in some embodiments, when the processing portion 120 detects that a mobile dock portion 140 is connected (e.g., in a mobile electronic console 100B configuration), the electronic console 100 may automatically transition to an XR mode 1051.

Figure 8B:
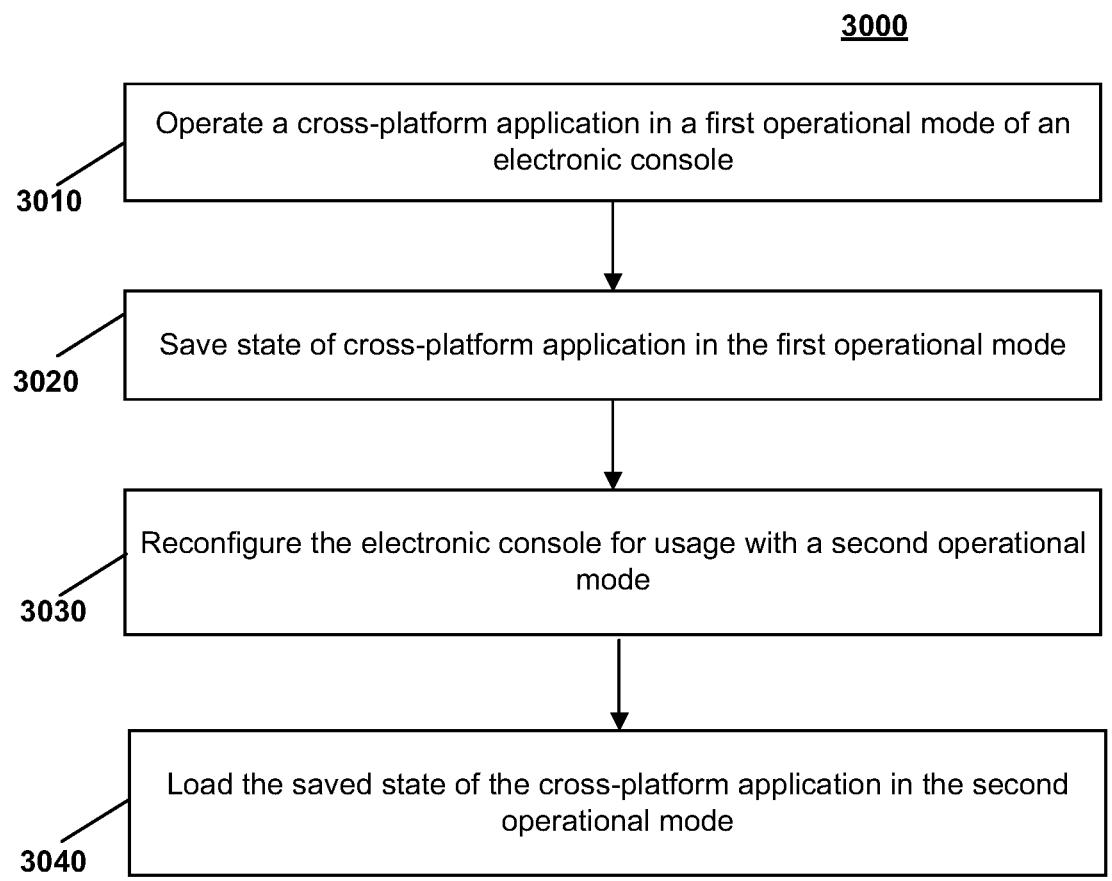
FIG. 8B is a flow chart illustrating a method for using a cross-platform application according to certain embodiments.

Turning ahead in the drawings, FIG. 8B illustrates a flow chart for a method 3000 for utilizing a cross-platform application across different operational modes 1050 according to certain embodiments. Method 3000 is merely exemplary and is not limited to the embodiments presented herein. Method 3000 can be employed in many different embodiments or examples not specifically depicted or described herein. In some embodiments, the activities of method 3000 can be performed in the order presented. In other embodiments, the activities of method 3000 can be performed in any suitable order. In still other embodiments, one or more of the activities of method 3000 can be combined or skipped. In many embodiments, processing portion 120 and/or a processing module included within processing portion 120 can be suitable to perform method 3000 and/or one or more of the activities of method 3000. In these or other embodiments, one or more of the activities of method 3000 can be implemented as one or more computer instructions configured to run at one or more processors 1010 (e.g., a Jetson TX 2 Module) and configured to be stored at one or more memory storage devices 1020. Such memory storage modules can be part of an electronic console 100.

In step 3010, a cross-platform application 1062 is operated in a first operational mode 1050 of an electronic console 100. For example, the first operational mode 1050 may be an XR mode 1051 (e.g., that is capable of using a HMD 150 to execute extended reality applications 161), a desktop mode 1052 (e.g., that executes an operating system 1054 and uses one or more peripheral devices to execute applications 1060), and/or a TV mode 1053 (e.g., that executes applications 160 over a television network and/or using television devices). The cross-platform application 1062 can be an application that is able to be operated in at least two operational modes 1050.

In step 3020, the state of cross-platform application 1062 is in the first operational mode 1050. For example, the cross-platform application 1062 may allow a user to engage in games and/or other digital functions, and the state of the games and/or digital functions can be saved to a storage device 1020 (e.g., a storage device 1020 included in the processing portion 120 of the electronic console 100).

In step 3030, the electronic console 100 can be reconfigured for usage with a second operational mode. Reconfiguring the electronic console 100 can include physically reassembling detaching and/or attaching hardware (e.g., a desktop dock portion 130, a mobile dock portion 140, a HMD 150, peripherals, etc.) to and from the electronic console 100. For example, in some cases, physically reconfiguring the electronic console 100 can include disconnecting a desktop dock portion 130 and peripheral devices from the electronic console 100, and connecting a mobile dock portion 140 and HMD 150 to the electronic console 110. Additionally, or alternatively, physically reconfiguring the electronic console 100 can include disconnecting a mobile dock portion 140 and HMD 150 from the electronic console 110, and connecting a desktop dock portion 130 and peripheral devices from the electronic console 100.

Additionally, or alternatively, reconfiguring the electronic console 100 can include reconfiguring software configurations of the electronic console 100. For example, in some cases, reconfiguring the electronic console 100 can include loading and/or providing access to HMD driver applications, operating systems, local applications, and/or other software applications.

In step 1340, the saved state of the cross-platform application 1062 is loaded in the second operational mode 1050. The second operational mode 1050 may be an XR mode 1051, a desktop mode 1052, and/or a TV mode 1053. The second operational mode 1050 can be any operational mode 1050 that is different from the first operational mode 1050.

After a user has loaded the cross-platform application 1062 in the second operational mode 1050, the user can resume playing or interacting with the cross-platform application 1062 from the point where the game was saved in the first operational mode 1550.

Figure 7A:
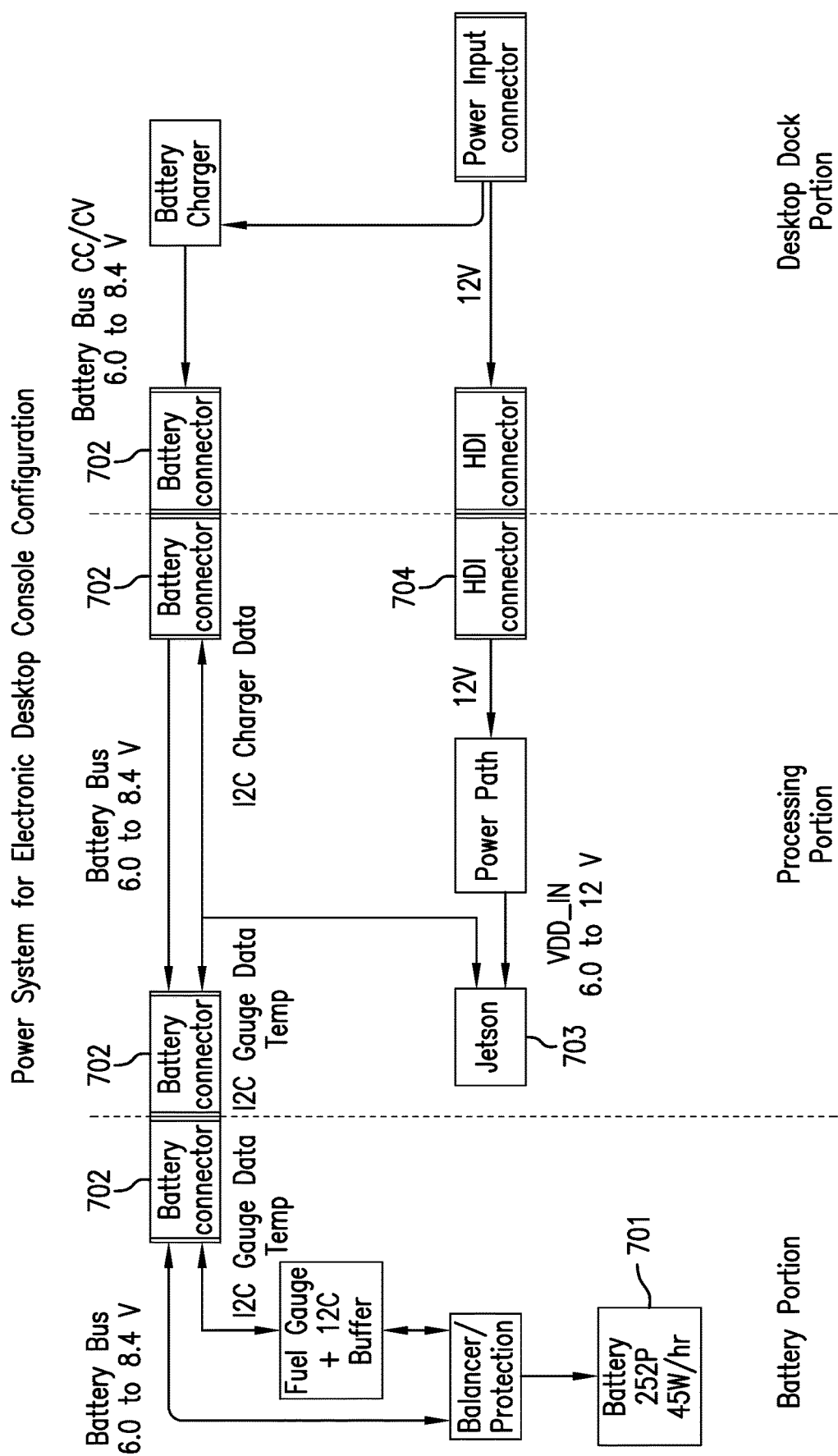
FIG. 7A is a block diagram illustrating an exemplary configuration for an electronic console arranged in a desktop configuration according to certain embodiments.
Figure 7B:
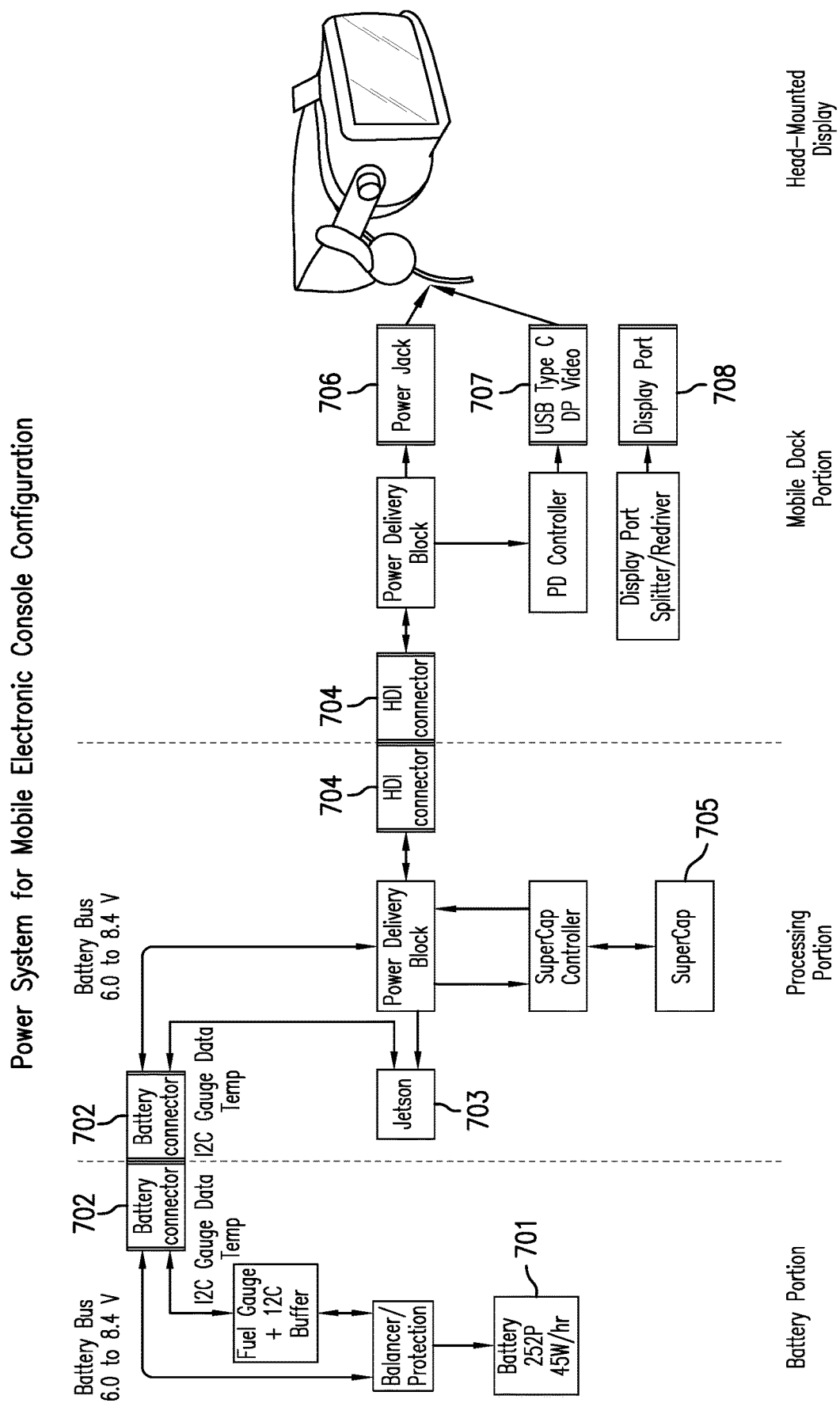
FIG. 7B is a block diagram illustrating an exemplary configuration for an electronic console arranged in a mobile configuration according to certain embodiments.
Figure 7C:
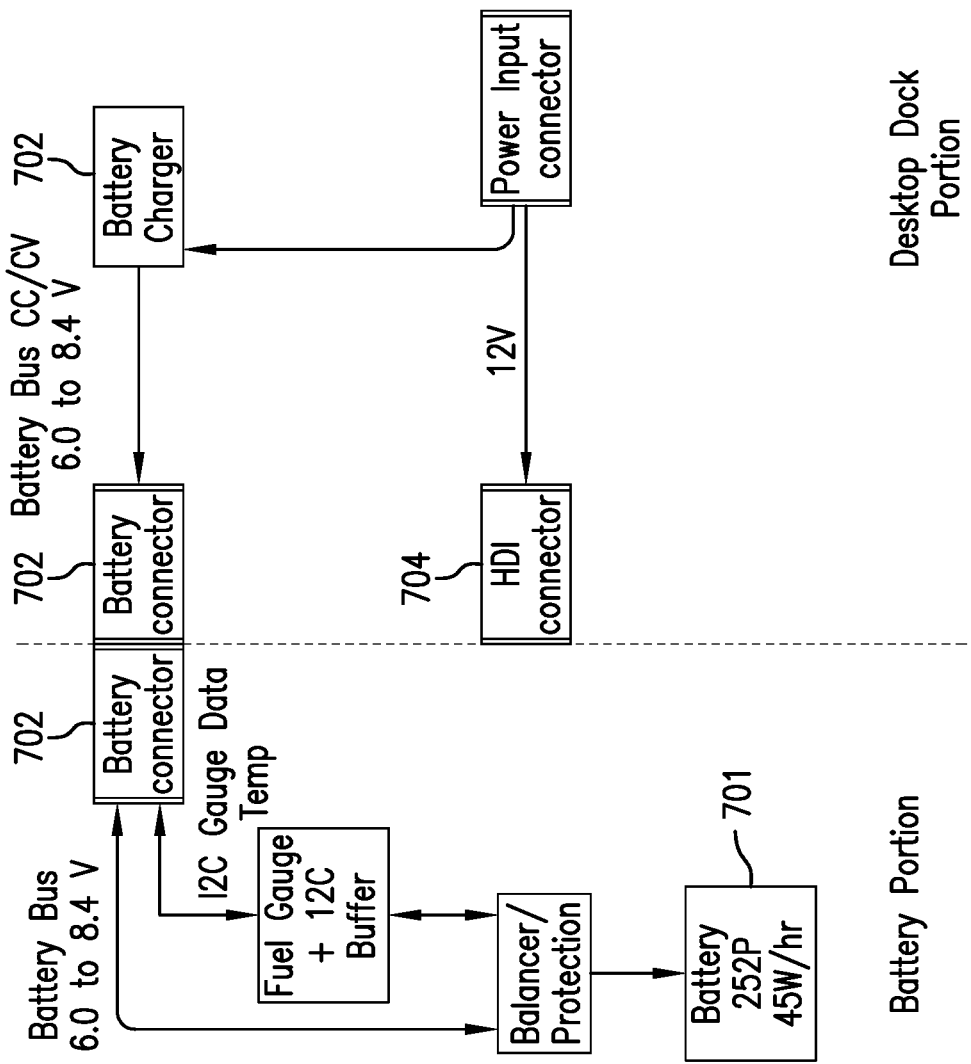
FIG. 7C is a block diagram illustrating an exemplary configuration for a battery portion connected to a desktop dock portion according to certain embodiments.
Figure 7D:
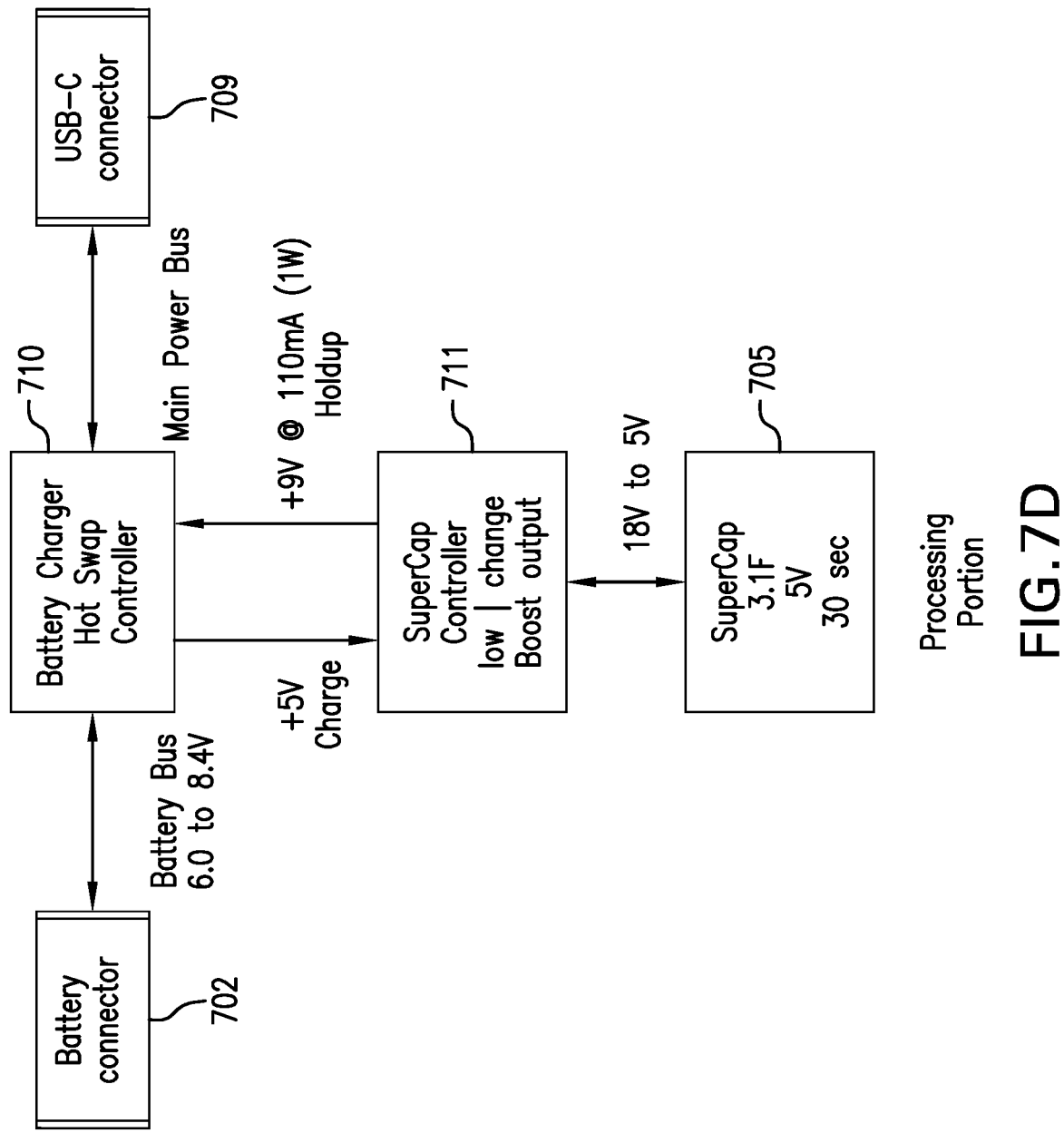
FIG. 7D is a block diagram illustrating an exemplary configuration for configuring an electronic console with a hot swappable battery according to certain embodiments.

FIG. 7A is a block diagram illustrating an exemplary configuration for an electronic console 100 arranged in an electronic desktop console 100A according to certain embodiments. The battery portion 110 includes one or more batteries 701 connected to a power balancing or protection component. The power balancing or protection component is connected to a fuel gauge or buffer, which, in turn, is connected to one or more battery connector 702 (which may represent one or more of the connectors 111 mentioned above). Each battery connector 702 included on the battery portion 110 is connected to a battery connector 702 included on the processing portion 120 (which may represent one of more of the connectors 121 mentioned above).

The processing portion 120 includes one or more processing modules 703 (e.g., including a Jetson TX2 Module) that is supplied power from the battery connector(s) 702 via a power path. The processing portion 120 further includes one or more second battery connectors 702 that supply power to the desktop dock portion 130, and one or more data connectors 704 (e.g., one or more high density interconnects) that permit data to be sent to, and received from the desktop dock portion 130, as well as any HMDs 150, peripherals, and/or devices connected to the desktop dock portion 130.

The desktop dock portion 130 includes one or more battery connectors 702 and one or more data connectors 704

(e.g., one or more high density interconnects) that are connected to the battery connector(s) 702 and data connector(s) 703 included on the processing portion 120. In some cases, the battery connector 702 and data connector 704 may be integrated into a single connector and, in other cases, may be included on separate connectors. The desktop dock portion 130 also includes a battery charger and power input connector that can be used to charge the battery portion 110 when connected to a wall outlet.

FIG. 7B is a block diagram illustrating an exemplary configuration for an electronic console arranged as a mobile electronic console 100B according to certain embodiments. The battery portion 110 includes the same configuration as discussed above with respect to FIG. 7A. In the mobile electronic console 100B, the processing portion 120 also utilizes a secondary energy storage unit (which may be a battery or super-capacitor 1043 (super-cap) and/or super-cap controller). The secondary energy storage unit 705 can store energy or charge which can be utilized to power the processing module 703 (e.g., a Jetson TX2 Module) in a low power or low energy mode when battery portions 110 are being swapped (e.g., when hot swapping batteries) and hot swappable battery functions 1040 are being executed.

Data connectors 704 (e.g., high density interconnects) connect the processing portion 120 to the mobile dock portion 140, and facilitate exchange of data between the HMD 150 connected to the mobile dock portion 140 and the processing portion 120. The same connectors also can be used to provide power to the mobile dock portion 140 and HMD 150. The mobile dock portion 140 includes a power delivery component and/or power jack 706 to supply power to the HMD 150 from the battery portion 110. The mobile dock portion 140 also includes a controller, display port splitter, video connector 707 (e.g., a USB Type C video connector), and/or display port 708 for transmitting data (e.g., audio, video, etc.) from the processing portion 120 for display and output via the HMD 150.

FIG. 7C is a block diagram illustrating an exemplary configuration for a battery portion 110 connected to a desktop dock portion 130 (e.g., as illustrated in FIG. 5). The battery portion 110 includes the same configuration as discussed above with respect to FIG. 7A. A power input connector, power charger, and battery connector 702 included in the desktop dock portion 130 permit power to be supplied to the battery portion 110 for charging the battery portion 110.

FIG. 7D is a block diagram illustrating an exemplary configuration for a processing portion 120 that is configured with hot swappable battery portions 1040. A hot swap controller 710 can transition the processing portion 120 between an active mode 1041 and a standby mode 1042 when battery portions 110 are being swapped. When operating in standby mode 1042, one or more processing modules included in the processing portion 120 may operate in a low power mode, and one or more energy storage units 705 (e.g., super-capacitors 1043) can power a limited portion of the processing modules. A booster or step-up module 711 connected the hot swap controller 710 and one or more energy storage units 705 (e.g., super-capacitors 1043) can adjust the voltage of power supplied to the processing portion 120.

Figure 9:
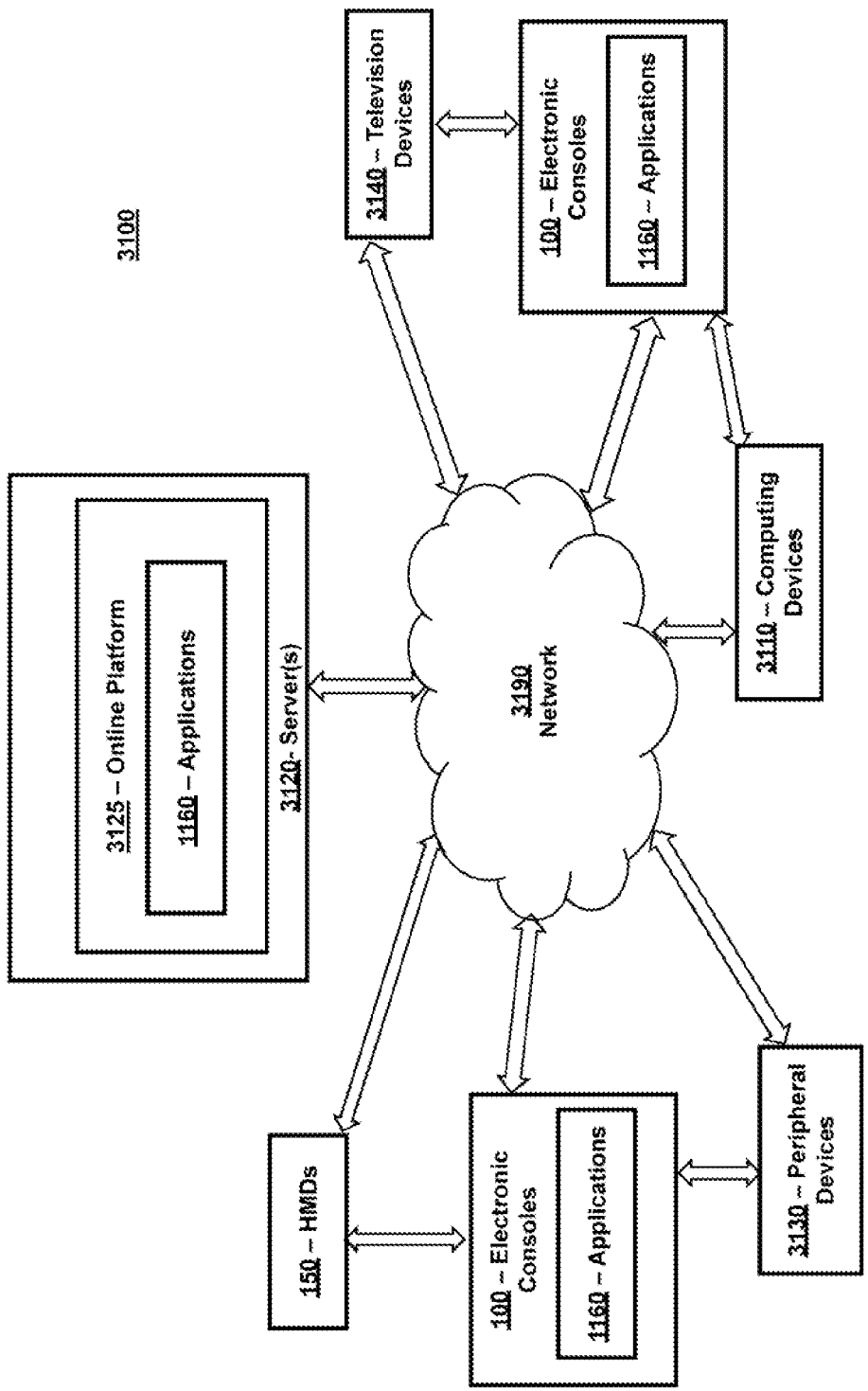
FIG. 9 is a diagram of a system according to certain embodiments.

FIG. 9 is a diagram of an exemplary system 3100 according to certain embodiments. In certain embodiments, the system 3100 comprises one or more electronic consoles 100, one or more computing devices 3110, one or more servers 3120, and one or more peripheral devices 3130, one or more television devices 3140, and one or more HMDs 150 that are in communication over a network 3190. An online platform 3125 is stored on, and executed by, the one or more servers 3120. The network 3190 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. The system 3100 may include any number of one or more electronic consoles 100, computing devices 3110, servers 3120, peripheral devices 3130, television devices 3140, and/or HMDs 150.

All the components illustrated in FIG. 9, including the electronic consoles 100, computing devices 3110, servers 3120, peripheral devices 3130, television devices 3140, HMDs 150, and/or online platform 3125 can be configured to communicate directly with each other and/or over the network 3190 via wired or wireless communication links, or a combination of the two. Each of the electronic consoles 100, computing devices 3110, servers 3120, peripheral devices 3130, television devices 3140, HMDs 150, and/or online platform 3125 also can be equipped with one or more transceiver devices, one or more computer storage devices (e.g., RAM, ROM, PROM, SRAM, etc.), and one or more processing devices that are capable of executing computer program instructions (including any of the storage devices 1020 and/or processor devices 110 mentioned herein)

In certain embodiments, the computing devices 3110 may represent desktop computers, laptop computers, mobile devices (e.g., smart phones, personal digital assistants, tablet devices, vehicular computing devices, wearable devices, and/or any other device that is mobile in nature), and/or other types of devices. The one or more servers 3120 may generally represent any type of computing device, including any of the computing devices 110 mentioned above. In certain embodiments, the one or more servers 3120 comprise one or more mainframe computing devices that execute web servers for communicating with the computing devices 3110, peripheral devices 3130, television devices 3140, and/or HMDs 150 over the network 3190 (e.g., over the Internet).

The online platform 3125 may represent a web-based platform, software-as-a-service platform, and/or web-based application that provides various functions and services to enhance user experiences and functionality associated with the electronic consoles 100. Amongst other things, the online platform 3125 may permit users of electronic consoles 100 to access, download, utilize, and/or execute applications 1060 over the network 3190. For example, users can access the online platform 3125 to access, download, utilize, and/or execute XR applications 1061 (e.g., virtual reality, mixed reality, and/or augmented reality applications), cross-platform applications 1062, and/or other applications. Each of the applications 1060 made available over the network 3190 can be configured to operate in at least one operational mode 1050 (e.g., XR mode 1051, desktop mode 1052, and/or TV mode 1053). At least a portion of the applications 1060 can include gaming or video game applications.

In certain embodiments, a system is disclosed. The system can include a modular electronic gaming console configured to execute one or more extended reality (XR) applications, comprising: a plurality of detachable console portions configured to be vertically arranged in a plurality of configurations, the plurality of detachable console portions including: (a) a processing portion, wherein: the processing portion includes a first housing that comprises a first top surface and a second bottom surface; the first top surface includes one or more first connectors; the second bottom surface includes one or more second connectors; (b) a battery portion, wherein: the battery portion includes a second housing that comprises a third bottom surface; the third bottom surface includes one or more third connectors that are configured to connect to the one or more first connectors included on the first top surface of the processing portion; the battery portion is configured to supply power to the processing portion when the one or more third connectors are connected to the one or more first connectors included on the processing portion; and (c) a dock portion, wherein: the dock portion includes a third housing that comprises a fourth top surface which includes one or more fourth connectors; and the one or more fourth connectors included on the fourth top surface are configured to connect to the second connectors included on the second bottom surface of the processing portion.

In certain embodiments, an electronic console is disclosed. The electronic console can include: a plurality of detachable console portions configured to be vertically arranged in a plurality of configurations, the plurality of detachable console portions including: (a) a processing portion, wherein: the processing portion includes one or more first connectors and one or more second connectors; and the processing portion is configured to execute one or more extended reality (XR) applications; (b) a battery portion, wherein: the battery portion includes one or more third connectors that are configured to connect to the one or more first connectors of the processing portion; the battery portion is configured to supply power to the processing portion when the one or more third connectors are connected to the one or more first connectors; and (c) a dock portion, wherein: the dock portion includes one or more fourth connectors that are configured to connect to the second connectors of the processing portion; wherein the processing portion, the battery portion, and the dock portion are each incorporated into a separate housing and arranged in a modular assembly.

In certain embodiments, an electronic console is disclosed. The electronic console can include: a modular assembly that includes a plurality of detachable console portions configured to be vertically arranged in a plurality of configurations, wherein: the plurality of detachable console portions include a processing portion, a battery portion, and a dock portion, the battery portion is configured to be detachable from the processing portion; the dock portion is configured to be detachable from the processing portion; the processing portion includes one or more processors configured to execute one or more extended reality (XR) applications; the dock portion includes one or more connection interfaces, the one or more connection interfaces at least including a connection interface for attaching a head-mounted device (HMD); when the battery portion and the dock portion are attached to the processing portion, the battery portion is configured to supply power to the processing portion and the dock portion.

In certain embodiments, an electronic console is disclosed. The electronic console can be configured to execute one or more extended reality (XR) applications, wherein the electronic console at least includes: (a) a battery portion comprising: a first housing; a first power source situated within the first housing, the first power source comprising one or more batteries; one or more first battery connectors; (b) a processing portion, comprising: a second housing that is configured to be attached to, and detached from, the first housing; a second power source; one or more second battery connectors that are configured to connect with the one or more first battery connectors included in the battery portion; one or more processors included within the second housing, the one or more processors being configured to execute the one or more XR applications; wherein: the first power source of the battery portion powers the electronic console in an active mode; a hot-swappable battery function is configured to transition the electronic console from the active mode to a standby mode that utilizes the second power source to power the electronic console.

In certain embodiments, a mobile electronic console is disclosed. The mobile electronic console can include: (a) a battery portion comprising a first housing that includes one or more batteries; (b) a processing portion comprising a second housing that includes one or more processors configured to execute an extended reality (XR) application and one or more secondary power sources; and (c) a mobile dock portion comprising a third housing that includes one or more connection interfaces, the one or more connection interfaces enabling connection of a head-mounted device (HMD); wherein: the first housing of the battery portion is configured to be detachable from the second housing of the processing portion; the processing portion is configured to execute a hot-swappable battery function that enables a state of the XR application to be saved when the battery portion is disconnected from the processing portion; and the hot-swappable battery function permits the XR application to be resumed from the saved state in response to detecting that a second battery portion has been connected to the processing portion or in response to detecting that the battery portion has be reconnected to the processing portion.

In certain embodiments, an electronic console is disclosed. The electronic console can include: a processing portion that includes one or more processors included within a housing, the one or more processors being configured to execute one or more extended reality (XR) applications; wherein the processing portion is configured to operate in multiple operational modes including: (a) an XR mode in which the electronic console operates as a gaming console that enables one or more XR applications to be execute, and one or more head-mounted devices (HMDs) to be connected and utilized in connection with the one or one more XR applications; and (b) a desktop mode in which the electronic console executes one or more desktop operating systems, and generates information for display on a computer peripheral devices.

In certain embodiments, an electronic console is disclosed. The electronic console can include: a processing portion that is configured to operate in multiple operational modes and configured to execute a cross-platform application; wherein executing the cross-platform application includes: executing the cross-platform application in a first operational mode; saving a state of the cross-platform application in the first operational mode; reconfiguring the electronic console for usage with a second operational mode; loading the saved state of the cross-platform application in the second operational mode; and executing the cross-platform application in the second operational mode.

In certain embodiments, a wearable carrier is disclosed. The wearable carrier can include: a housing that is capable of being worn by an individual; one or more compartments integrated into the housing, the one or more compartments being configured to house a mobile electronic console; one or more head-mounted device (HMD) connectors integrated into the housing, wherein the one or more HMD connectors enable one or more head-mounted devices (HMDs) to be connected to the wearable carrier; and one or more wire connectors integrated into the housing, the one or more wire connectors enabling the mobile electronic console to provide power to the one or more HMDs connected to the one or more HMD connectors, and enabling data to be exchanged between the one or more HMDs and the mobile electronic console.

In certain embodiments, a wearable carrier is disclosed. The wearable carrier can include: one or more compartments, the one or more compartments being configured to house a mobile electronic console; one or more head-mounted device (HMD) connectors that enable one or more head-mounted devices (HMDs) to be connected to the wearable carrier; and one or more wire connectors integrated into the wearable carrier, the one or more wire connectors being configured to connect the mobile electronic console to the one or more HMD connectors.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. An electronic console, comprising:
a plurality of detachable console portions configured to be vertically arranged in a plurality of configurations, the plurality of detachable console portions including:
(a) a processing portion, wherein:
the processing portion includes, one or more processors, one or more first connectors and one or more second connectors; and
the one or more processors of the processing portion are configured to execute one or more extended reality (XR) applications;
(b) a battery portion, wherein:
the battery portion includes one or more third connectors that are configured to connect to the one or more first connectors of the processing portion;
the battery portion is configured to supply power to the processing portion when the one or more third connectors are connected to the one or more first connectors; and
(c) a dock portion, wherein:
the dock portion includes one or more fourth connectors that are configured to connect to the second connectors of the processing portion;
wherein the processing portion, the battery portion, and the dock portion are each incorporated into a separate housing and arranged in a modular assembly;
wherein the processing portion, the battery portion, and the dock portion each include a curved surface having a U-shaped curvature.

2. The electronic console of claim 1, wherein the dock portion includes: a mobile dock portion integrated into a wearable apparatus; or a desktop dock portion configured to rest on a flat surface.

3. The electronic console of claim 1, wherein the electronic console is configured to be physically transitioned to a charging configuration in which the battery portion is directly connected to the dock portion.

4. The electronic console of claim 1, wherein:
the dock portion includes one or more connection interfaces, the one or more connection interfaces at least include a headset connector that enables a head-mounted device (HMD) to be connected to the dock portion; and
the battery portion is configured to provide power to the processing portion and dock portion when the one or more first connectors are connected to the one or more third connectors and the one or more fourth connectors are connected to the one or more second connectors.

5. The electronic console of claim 1, wherein:
power is supplied form the battery portion to the processing portion by a first connection formed between the one or more first connectors and the one or more one or more third connectors;
power is supplied from the processing portion to the dock portion by a second connection formed between the one or more second connectors and the one or more one or more fourth connectors; and
data is exchanged between the processing portion and the dock portion by the second connection formed between the one or more second connectors and the one or more one or more fourth connectors.

6. The electronic console of claim 1, wherein:
the modular assembly of the electronic console (a) permits the battery portion to be attached and detached from the processing portion and (b) permits the dock portion to be attached and detached from the processing portion; and
the one or more first connectors, the one or more second connectors, the one or more third connectors, and the one or more fourth connectors each comprise one or more magnetic connectors.

7. The electronic console of claim 1, wherein the processing portion is configured to execute a hot swappable battery function that enables the electronic console to operate in a standby mode when the battery portion is disconnected from the processing portion.

8. The electronic console of claim 1, wherein the electronic console can be configured to operate in a plurality of operation modes including:
an XR mode in which the electronic console permits a head-mounted device (HMD) to be connected and utilized to interact with an XR application;
a television mode (TV) mode in which the electronic console communicates over one or more television networks and outputs data to one or more television devices; and
a desktop mode in which the electronic console executes a desktop operating system and is connected to one or more peripheral devices.

9. The electronic console of claim 1, wherein:
the processing portion includes a dynamic device manager;
the dynamic device manager permits a plurality of head-mounted devices (HMD) to be connected and utilized with the electronic console; and
the dynamic device manager automatically detects a type of a HMD that is connected to the dock portion, and automatically adjusts power settings, video settings, or sensor settings to facilitate usage of the HMD with the electronic console.

10. The electronic console of claim 3, wherein the modular assembly of the gaming console is further configured to be physically transitioned to:
(a) a mobile electronic configuration in which the dock portion is a mobile dock portion, and the processing portion is physically connected to the mobile dock portion;
(b) an electronic desktop configuration in which the dock portion is a desktop dock portion, and the processing portion is physically connected to the desktop dock portion.

11. An electronic console, comprising:
a modular assembly that includes a plurality of detachable console portions configured to be vertically arranged in a plurality of configurations, wherein:
the plurality of detachable console portions include a processing portion, a battery portion, and a dock portion, wherein the processing portion, the battery portion, and the dock portion each include a curved surface having a U-shaped curvature;
the battery portion is configured to be detachable from the processing portion;
the dock portion is configured to be detachable from the processing portion;
the processing portion includes one or more processors configured to execute one or more extended reality (XR) applications;
the dock portion includes one or more connection interfaces, the one or more connection interfaces at least including a connection interface for attaching a head-mounted device (HMD);
when the battery portion and the dock portion are attached to the processing portion, the battery portion is configured to supply power to the processing portion and the dock portion.

12. The electronic console of claim 11, wherein the electronic console is configured to be physically transitioned to a charging configuration in which the battery portion is directly connected to the dock portion.

* * * * *